United States Patent
Morrison et al.

(10) Patent No.: US 11,230,860 B2
(45) Date of Patent: Jan. 25, 2022

(54) IMETHODS AND SYSTEMS FOR OPERABLY CONNECTING NOTEBOOK COMPUTING COMPONENTS USING ELECTROPERMANENT MAGNETS

(71) Applicant: Dell Products, LP, Round Rock, TX (US)

(72) Inventors: Jason S. Morrison, Chadron, NE (US); Anthony J. Sanchez, Pflugerville, TX (US); David J. Hernandez, Round Rock, TX (US); Laurent A. Regimbal, Georgetown, TX (US)

(73) Assignee: Dell Products, LP, Round Rock, TX (US)

( * ) Notice: Subject to any disclaimer, the term of this patent is extended or adjusted under 35 U.S.C. 154(b) by 398 days.

(21) Appl. No.: 16/440,176

(22) Filed: Jun. 13, 2019

(65) Prior Publication Data
US 2020/0392759 A1    Dec. 17, 2020

(51) Int. Cl.
| | |
|---|---|
| *E05B 47/06* | (2006.01) |
| *G06F 1/16* | (2006.01) |
| *E05B 47/00* | (2006.01) |
| *H01F 41/02* | (2006.01) |
| *H01F 7/02* | (2006.01) |
| *H01F 7/18* | (2006.01) |

(52) U.S. Cl.
CPC ...... *E05B 47/0642* (2013.01); *E05B 47/0006* (2013.01); *E05B 47/0038* (2013.01); *E05B 47/0607* (2013.01); *G06F 1/1607* (2013.01); *G06F 1/1654* (2013.01); *G06F 1/1679* (2013.01); *H01F 7/0263* (2013.01); *H01F 7/1805* (2013.01); *H01F 41/0293* (2013.01); *E05B 2047/0007* (2013.01)

(58) Field of Classification Search
CPC .................................................. E05B 2047/007
See application file for complete search history.

(56) References Cited

U.S. PATENT DOCUMENTS

| | | | |
|---|---|---|---|
| 10,031,559 B1 * | 7/2018 | Hamel | H01F 13/003 |
| 10,359,861 B2 * | 7/2019 | Yamada | H04M 1/0254 |
| 2019/0385772 A1 * | 12/2019 | Denham | H01F 7/0205 |

* cited by examiner

*Primary Examiner* — Mukundbhai G Patel
(74) *Attorney, Agent, or Firm* — Prol Intellectual Property Law, PLLC; H. Kenneth Prol

(57) ABSTRACT

A dual-contact electro-permanent magnet (EPM) assembly of an information handling system may comprise a plurality of high-coercivity magnets situated on opposite ends of a low-coercivity magnet, a first EPM magnetic contact disposed between a first of the plurality of high-coercivity magnets and the low-coercivity magnet, and a second EPM magnetic contact disposed between a second of the plurality of high-coercivity magnets and the low-coercivity magnet. The low-coercivity magnet polarity may correlate to a direction of current pulse applied to an electrically conductive wire coiled around the low-coercivity magnet, and dependent upon the low-coercivity magnet polarity, the first EPM magnetic contact is capable of operating in an attractive magnetic state to attract a ferromagnetic contact of a peripheral device while the second EPM magnetic contact is magnetically neutral with respect to the ferromagnetic contact.

20 Claims, 19 Drawing Sheets

EXPLODED PERSPECTIVE VIEW

DETACHABLE CHASSIS ATTACHED POSITION PERSPECTIVE VIEW

PERSPECTIVE VIEW

DETACHABLE CHASSIS
ATTACHED POSITION
PERSPECTIVE VIEW

EPM CHASSIS CLOSURE
ASSEMBLY WITH ATTRACTING
POLARITY
CROSS-SECTIONAL SIDE VIEW

EPM CHASSIS CLOSURE
ASSEMBLY WITH REPELLING
POLARITY
CROSS-SECTIONAL SIDE VIEW

EPM /PERMANENT MAGNET CHASSIS
CLOSURE ASSEMBLY WITH HORIZONTALLY
ATTRACTING POLARITY
FRONT VIEW

EPM /PERMANENT MAGNET CHASSIS
CLOSURE ASSEMBLY WITH HORIZONTALLY
ATTRACTING POLARITY
CROSS-SECTIONAL SIDE VIEW

EPM /PERMANENT MAGNET CHASSIS
CLOSURE ASSEMBLY WITH HORIZONTALLY
REPELLING POLARITY
CROSS-SECTIONAL SIDE VIEW

EPM /PERMANENT MAGNET CHASSIS
CLOSURE ASSEMBLY WITH HORIZONTALLY
REPELLING POLARITY
FRONT VIEW

INTEGRATED PIN AND
EPM PIN DETENT ASSEMBLY
CUT AWAY VIEW

CUT AWAY VIEW
EPM-ASSISTED
PERIPHERAL DEVICE
ATTACHMENT

METHODS AND SYSTEMS FOR OPERABLY CONNECTING NOTEBOOK COMPUTING COMPONENTS USING ELECTROPERMANENT MAGNETS

FIELD OF THE DISCLOSURE

The present disclosure generally relates to methods and devices for attaching multiple components of an information handling system chassis or peripheral devices. The present disclosure more specifically relates to the use of electropermanent magnets in attaching multiple components of an information handling system chassis or peripheral devices.

BACKGROUND

As the value and use of information continues to increase, individuals and businesses seek additional ways to process and store information. One option available to clients is information handling systems. An information handling system generally processes, compiles, stores, or communicates information or data for business, personal, or other purposes thereby allowing clients to take advantage of the value of the information. Because technology and information handling needs and requirements vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. Further, the information handling system may include multiple components, or peripherals operably coupled together.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
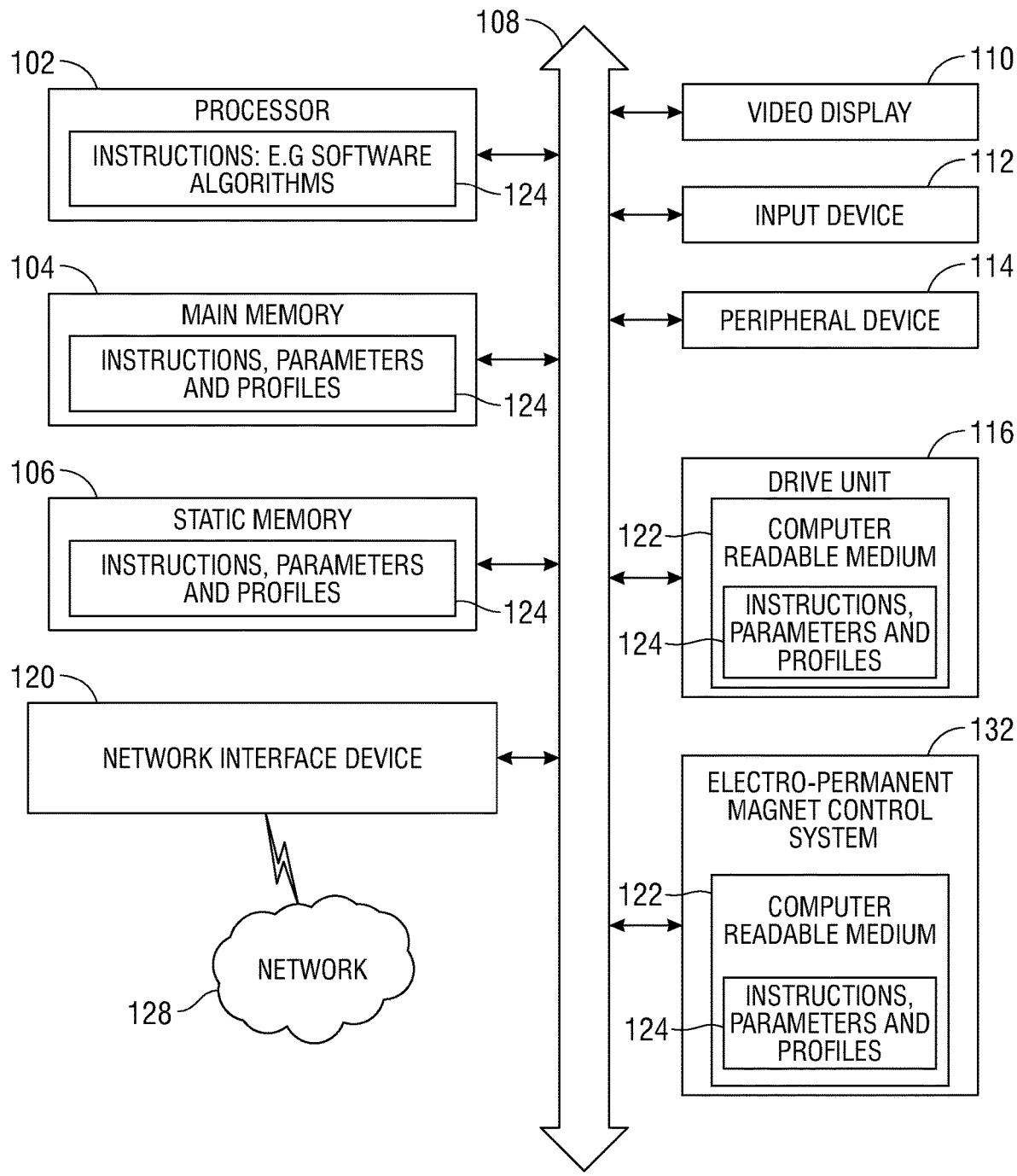
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

The market for information handling systems prizes ease of mobility, and security. In order to provide both of these advantages, many information handling systems are enclosed in multiple chasses to form a laptop configuration having a base chassis including the keyboard operably attached via a hinge to a display chassis including the video display. Such a laptop information handling system may be placed in a closed configuration in which the portion of the display chassis housing the video display is placed adjacent to the portion of the base chassis enclosing the keyboard. In such a configuration, the information displayed on the video display may be hidden from view, and entry of information via the keyboard may be inhibited. While placed in such a configuration, the information handling system may be transported without exposing the keyboard or digital display to inadvertent contact with outside objects that may harm those interfaces. The information handling system may also be secured by locking the display chassis and base chassis in this closed configuration until some form of authorized identification is received. Many of these existing systems employ permanent magnets or electromagnets to attract a portion of the display chassis opposite the hinge toward a portion of the base chassis opposite the hinge, such that the chasses tend to remain in the closed configuration during transport, until the user intentionally attempts to separate them. In low profile platforms, separating the display chassis from the base chassis can be difficult.

User desire for ease of mobility has also driven information handling system design toward mobile systems that allow for tablet configurations, or the ability to detach the video display from the keyboard. For example, many laptops can be placed in a tablet configuration in which the display chassis is rotated nearly 180 degrees away from the base chassis, such that the top cover of the display chassis is adjacent to the bottom cover of the base chassis. In other existing systems, the display chassis may be detached from the base chassis entirely. These existing systems also may allow the user to provide user input directly through interaction with the video display using touch via a finger or a stylus. Many of these existing systems employ permanent magnets or electromagnets to operably attach the base chassis and the display chassis using enough force such that the chasses do not tend to inadvertently disconnect during use in a laptop mode, but the user may easily detach them when desired.

As the market for information handling systems has moved toward the use of tablet configurations and detachable notebook display chasses, a simultaneous need for securing a stylus or other small peripheral devices to the information handling systems has also arisen. Many users employ a stylus to provide information via the touch-screen video display in a tablet configuration. The relatively small size of the stylus makes them easy to lose. Thus, many information handling systems that allow interface with such a stylus provide some ability to operably connect the stylus to one of the chasses of the information handling system when it is not in use, decreasing the likelihood the stylus will be lost. Many of these existing systems employ permanent magnets or other structures to operably attach the stylus or other peripheral devices to the information handling system.

Embodiments of the present disclosure employ electropermanent magnets (EPM), which may comprise at least one low-coercivity magnet located adjacent or nearby a high-coercivity magnet. An electrically conductive wire may be coiled around the low-coercivity magnet, such that a pulse of current applied to the conductive wire causes the low-coercivity magnet to switch polarity of its magnetic field. The low-coercivity magnetic field may either combine with or negate a magnetic field generated by the adjacent high-coercivity magnet, depending on their respective polarities. For example, if the low-coercivity magnetic field polarity lines up with the polarity of the high-coercivity magnetic field, the low-coercivity magnetic field may combine with the high-coercivity magnetic field to form a combined EPM magnetic field. In contrast, if the low-coercivity magnetic field and high-coercivity magnetic field have opposite polarities, the low-coercivity magnetic field may partially or fully negate the high-coercivity magnetic field, such that the EPM assembly does not generate a combined magnetic field. An EPM assembly in embodiments described herein may be said to be in an ON state when the high-coercivity magnetic field is combined with the low-coercivity magnetic field to generate a combined EPM magnetic field, and can be said to be in an OFF state when the EPM does not generate a combined magnetic field.

An electropermanent magnet control system in an embodiment may dictate the polarity of the low-coercivity magnetic field by controlling the direction of the current applied to the conductive wire coiled about it. Thus, by changing the direction of the current pulse applied to the wire, the electropermanent magnet control system in embodiments of the present disclosure may cause the electropermanent magnet to enter an "ON" state in which the high-coercivity and low-coercivity magnet fields combine, or an "OFF" state in which the low-coercivity magnetic field at least partially cancels out the high-coercivity magnetic field. In such a way, the electropermanent magnet control system may change the magnetism of an EPM by applying a pulse of current, rather than a continuous supply of power.

Embodiments of the present disclosure include multiple configurations of the high-coercivity and low-coercivity magnets within an EPM, based on intended applications. For example, an EPM of a peripheral device detent mechanism in embodiments of the present disclosure may include a low-coercivity magnet completely surrounding a cylindrical high-coercivity magnet, such that the combined low-coercivity and high-coercivity magnetic fields may lock a ferromagnetic pin inside an opening of the high-coercivity magnet. As another example, a low-coercivity magnet may be located adjacent one or more high-coercivity magnets within an EPM assembly to attract a ferromagnetic contact surface toward the EPM. Such configurations may be used (alone or in combination with existing permanent magnets) in embodiments of the present disclosure, for example, to attract a portion of the display chassis opposite the hinge toward a portion of the base chassis opposite the hinge, such that the chasses tend to remain in the closed configuration during transport, until the user intentionally attempts to separate them. In such embodiments, the electropermanent magnet within the base chassis may attract a ferromagnetic contact within the display chassis while the electropermanent magnet is placed in an ON state. The user may easily open the chasses when the electropermanent magnet is placed in an OFF state by the EPM Control system in such embodiments.

In other embodiments, the EPM control system may adjust a dual-EPM assembly comprising multiple high-coercivity magnets housed within the base chassis, such that it can either repel or attract the ferromagnetic contact housed in the display chassis, depending on the direction of the current pulse supplied. For example, when placed in a closed configuration, the EPM control system may apply a current pulse causing the dual-EPM assembly to attract the ferromagnetic contact. Upon receiving an instruction to place the chasses in the open configuration, the EPM Control system in such embodiments may apply a current pulse in the opposite direction, causing the dual-EPM assembly to repel the ferromagnetic contact. This repelling force may cause the chasses to open slightly.

Still other embodiments may further include a permanent magnet housed within the base chassis operating to repel a ferromagnetic contact within the display chassis. In such embodiments, the attractive force of an adjacent or nearby electropermanent magnet may be greater than the repelling force of the permanent magnet when the electropermanent magnet is in an ON state. However, when the electropermanent magnet is placed in an OFF state, the repelling force of the permanent magnet may cause the chasses to open slightly, making it easier for the user to fully open the chasses into a laptop or tablet configuration.

Electropermanent magnets may also be used (alone or in combination with existing permanent magnets) in embodiments of the present disclosure, for example, to operably attach the base chassis and the display chassis such that the chasses do not tend to inadvertently disconnect during use in a laptop mode, but the user may easily detach them when desired. Use of permanent magnets to operably connect the display chassis to the base chassis in existing systems may result in inadvertent separation of the two, because the magnetic field generated by the permanent magnets may be too small to lock the chasses in place with respect to one another. In contrast, use of electromagnets to operably connect the display chassis to the base chassis in existing systems may effectively lock the chasses in place with respect to one another, but may rapidly deplete power stores. Embodiments of the present disclosure may use electropermanent magnets to effectively lock the chasses in place with respect to one another when the EPM control system places the electropermanent magnets in an ON state with a magnetic field using only a single pulse of current, rather than a constant supply of power. By placing the electropermanent magnets in such embodiments in an OFF state with a partially or fully integrated magnetic field, the EPM control system may enable the user to easily detach the display chassis from the base chassis. The EPM control system may similarly control electropermanent magnets to operably connect and disconnect a stylus or other peripheral device to the base chassis in embodiments of the present disclosure.

FIG. 1 illustrates an information handling system 100 similar to information handling systems according to several aspects of the present disclosure. In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP), a base station transceiver, a wireless telephone, a land-line telephone, a control system, a camera, a scanner, a facsimile machine, a printer, a pager, a personal trusted device, a web appliance, or any other suitable machine capable of executing a set of instructions (sequential or otherwise) that specify actions to be taken by that machine, and can vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the computer system 100 can be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

Information handling system 100 can include devices or modules that embody one or more of the devices or execute instructions for the one or more systems and modules described above, and operates to perform one or more of the methods described above. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), control logic or some combination of the same. Any of the processing resources may operate to execute code that is either firmware or software code. Moreover, the information handling system 100 can include memory such as main memory 104, static memory 106, computer readable medium 122 storing instructions 124 of the electropermanent magnet control system 132, and drive unit 116 (volatile (e.g. random-access memory, etc.), nonvolatile (read-only memory, flash memory etc.) or any combination thereof). The information handling system 100 can also include one or more buses 108 operable to transmit communications between the various hardware components such as any combination of various input and output (I/O) devices.

As shown, the information handling system 100 may further include a video display 110. The video display 110 in an embodiment may function as a liquid crystal display (LCD), an organic light emitting diode (OLED), a flat panel display, a solid state display, or a cathode ray tube (CRT). Additionally, the information handling system 100 may include an input device 112, such as a keyboard, a cursor control device (e.g., mouse, touchpad, gesture or touch screen input, microphone, fingerprint scanner, iris scanner, gyroscope, or hall effect sensor) and a peripheral device 114, such as a USB device, mobile information handling system, key fob, locking mechanism, or stylus. In other embodiments, the peripheral device may comprise a display chassis housing the display 110, which may be detachable from a base chassis housing the keyboard. The information handling system 100 can also include a disk drive unit 116.

The network interface device shown as wireless adapter 120 can provide connectivity to a network 128, e.g., a wide area network (WAN), a local area network (LAN), wireless local area network (WLAN), a wireless personal area network (WPAN), a wireless wide area network (WWAN), or other network. Connectivity may be via wired or wireless connection. The wireless adapter 120 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. In some aspects of the present disclosure, one wireless adapter 120 may operate two or more wireless links. The wireless network may have a wireless mesh architecture in accordance with mesh networks described by the wireless data communications standards or similar standards in some embodiments but not necessarily in all embodiments.

Wireless adapter 120 may connect to any combination of macro-cellular wireless connections including 2G, 2.5G, 3G, 4G, 5G or the like from one or more service providers. Utilization of radiofrequency communication bands according to several example embodiments of the present disclosure may include bands used with the WLAN standards and WWAN carriers, which may operate in both license and unlicensed spectrums. For example, both WLAN and WWAN may use the Unlicensed National Information Infrastructure (U-NII) band which typically operates in the ~5 MHz frequency band such as 802.11 a/h/j/n/ac (e.g., center frequencies between 5.170-5.785 GHz). It is understood that any number of available channels may be available under the 5 GHz shared communication frequency band. WLAN, for example, may also operate at a 2.4 GHz band. WWAN may operate in a number of bands, some of which are proprietary but may include a wireless communication frequency band at approximately 2.5 GHz band for example. In additional examples, WWAN carrier licensed bands may operate at frequency bands of approximately 700 MHz, 800 MHz, 1900 MHz, or 1700/2100 MHz for example as well.

In the example embodiment, mobile information handling system 100 includes both unlicensed wireless radio frequency communication capabilities as well as licensed wireless radio frequency communication capabilities. For example, licensed wireless radio frequency communication capabilities may be available via a subscriber carrier wireless service.

In some embodiments, software, firmware, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions, parameters, and profiles 124 or receives and executes instructions, parameters, and profiles 124 responsive to a propagated signal, so that a device connected to a network 128 can communicate voice, video or data over the network 128. Further, the instructions 124 may be transmitted or received over the network 128 via the network interface device or wireless adapter 120.

The information handling system 100 can include a set of instructions 124 that can be executed to cause the computer system to perform any one or more of the methods or computer based functions disclosed herein. For example, instructions 124 may execute an electropermanent magnet control system 132, software agents, or other aspects or components. Various software modules comprising application instructions 124 may be coordinated by an operating system (OS), or via an application programming interface (API). An example operating system may include Windows®, Android®, and other OS types known in the art. Example APIs may include Win 32, Core Java API, or Android APIs.

The disk drive unit 116 and the electropermanent magnet control system 132 may include a computer-readable medium 122 in which one or more sets of instructions 124 such as software can be embedded. Similarly, main memory 104 and static memory 106 may also contain a computer-readable medium for storage of one or more sets of instructions, parameters, or profiles 124 including an estimated training duration table. The disk drive unit 116 and static memory 106 also contain space for data storage. Further, the instructions 124 may embody one or more of the methods or logic as described herein. For example, instructions relating to the electropermanent magnet control system 132 software algorithms may be stored here. In a particular embodiment, the instructions, parameters, and profiles 124 may reside completely, or at least partially, within the main memory 104, the static memory 106, or within the disk drive 116 during execution by the processor 102 of information handling system 100. As explained, some or all of the electropermanent magnet control system 132 may be executed locally or remotely. The main memory 104 and the processor 102 also may include computer-readable media.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The electropermanent magnet control system 132 may be stored in static memory 106, or the drive unit 116 on a computer-readable medium 122 such as a flash memory or magnetic disk in an example embodiment. While the computer-readable medium is shown to be a single medium, the term "computer-readable medium" includes a single medium or multiple media, such as a centralized or distributed database, or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The information handling system 100 may also include an electropermanent magnet control system 132 that may be operably connected to the bus 108. The electropermanent magnet control system 132 computer readable medium 122 may also contain space for data storage. The electropermanent magnet control system 132 may perform tasks related to supplying a current to an electrically conductive wire coiled around a low-coercivity magnet of an electropermanent magnet, to partially or fully combine with or negate a magnetic field generated by an adjacent high-coercivity magnet.

In an embodiment, the electropermanent magnet control system 132 may communicate with the main memory 104, the processor 102, the video display 110, the alpha-numeric input device 112, and the network interface device 120 via bus 108, and several forms of communication may be used, including ACPI, SMBus, a 24 MHZ BFSK-coded transmission channel, or shared memory. Keyboard driver software, firmware, controllers and the like may communicate with applications on the information handling system.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module can also include a combination of the foregoing examples of hardware or software. Note that an information handling system can include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2A:
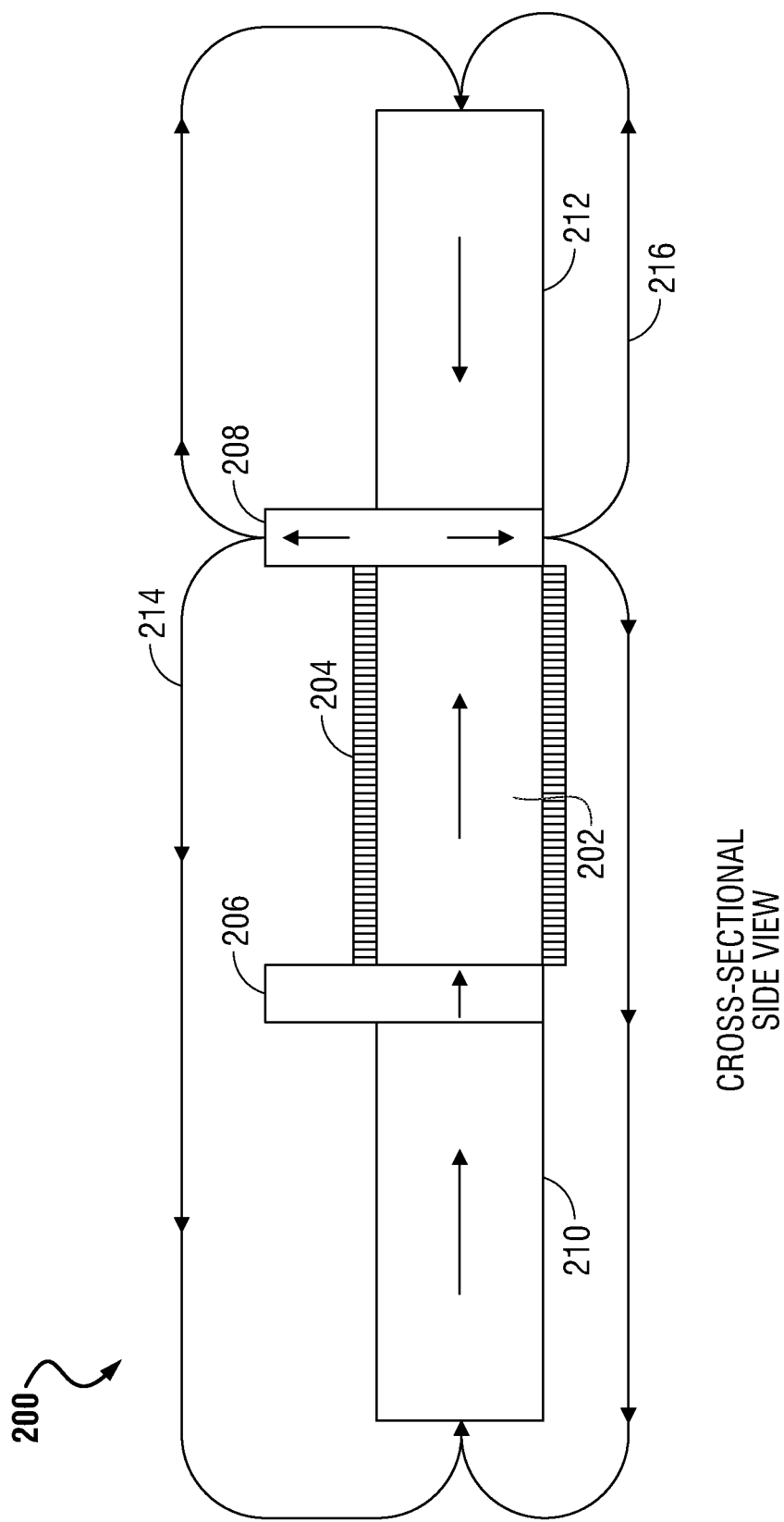
FIG. 2A is a cross-sectional side view of a dual-contact EPM assembly generating a magnetic field propagating through a first ferromagnetic contact according to an embodiment of the present disclosure.

FIG. 2A is a cross-sectional side view of a dual-contact EPM assembly generating a magnetic field propagating perpendicularly to the dual-contact EPM assembly through a first ferromagnetic contact to the right of a low-coercivity magnet according to an embodiment of the present disclosure. An electropermanent magnet in embodiments of the present disclosure may comprise at least one low-coercivity magnet located adjacent or nearby a high-coercivity magnet. For example, a dual-contact EPM assembly 200 in an embodiment may include a low-coercivity magnet 202 situated adjacent to high-coercivity magnets 210 and 212. The high-coercivity magnets 210 and 212 in an embodiment may be comprised of a combination of Neodymium, Iron, and Boron. The low-coercivity magnet 202 may be comprised of a combination of aluminum, nickel, and cobalt. Other embodiments contemplate the use of any of these materials individually, of other materials, or of other combinations that include these materials or others generally used to create permanent magnets, including ferrous platinum, a combination of dysprosium, niobium, gallium and cobalt, and samarium-cobalt. An electrically conductive wire 204 may be coiled around the low-coercivity magnet 202 in an embodiment, such that a pulse of current applied to the conductive wire 204 causes the low-coercivity magnet 202 to generate a magnetic field. In some embodiments, the wire 204 coils around only a portion of the exterior surface area of the low-coercivity magnet 202. In other embodiments, the wire 204 coils around the entirety of the exterior surface area of the low-coercivity magnet 202. In still other embodiments, the wire 204 may additionally coil around all or a portion of the high-coercivity magnet 210 or 212.

The high-coercivity magnets 210 and 212 in an embodiment may have poles situated opposite one another. For example, the high-coercivity magnet 210 may generate a magnetic field having a north pole on its right side, adjacent to the magnetic contact 206, while the high-coercivity magnet 212 generates a magnetic field having a north pole on its left side, adjacent to the magnetic contact 208.

Ferromagnetic shunts situated between the low-coercivity magnet 202 and the high-coercivity magnets 210 and 212 may form magnetic contacts in an embodiment. For example, magnetic contact 206 may be situated between the high-coercivity magnet 210 and the low-coercivity magnet 202. As another example, magnetic contact 208 may be situated between the high-coercivity magnet 212 and the low-coercivity magnet 202. Each of the magnetic contacts 206 and 208 may be comprised of a ferromagnetic material, such as steel. As such, the magnetic fields generated by the low-coercivity magnet 202 and high-coercivity magnets 210 and 212 may be propagated through the ferromagnetic materials of magnetic contacts 206 and 208.

An EPM control system in an embodiment may control the application of current pulses to the coiled electrically conductive wire 204. The polarity of the magnetic field generated by the low-coercivity magnet 202 in an embodiment may be dictated by the direction in which such an EPM control system applies the current pulse to the coiled wire 204. For example, the EPM control system in an embodiment may apply a current pulse to the wire 204 shown in FIG. 2A, causing the north pole of the magnetic field generated by the low-coercivity magnet 202 to be located on the right-hand side of the low-coercivity magnet 202, adjacent to magnetic contact 208. Thus, the magnetic field generated by the low-coercivity magnet 202 may have poles that line up with the high-coercivity magnet 210, such that these magnetic fields combine to form a combined magnetic field 214. Because the north pole of the high-coercivity magnet 210 field is located adjacent the south pole of the low-coercivity magnet 202 in such an embodiment, the magnetic field 214 may be propagated horizontally through the magnetic contact 206. As such, the magnetic field 214 may not generate any magnetic force acting perpendicularly to the top surface of the EPM assembly 200 at magnetic contact 206 to attract or other ferromagnetic materials.

The north pole of the magnetic field generated by the low-coercivity magnet 202 in an embodiment shown in FIG. 2A may be situated adjacent the north pole of the magnetic field 216 generated by the high-coercivity magnet 212. Because the poles of these adjacent magnetic fields 214 and 216 are in opposite configurations, neither of these fields 214 or 216 may propagate horizontally through the magnetic contact 208. Rather, both the magnetic fields 214 and 216 may propagate vertically or perpendicularly with respect to the top surface of the EPM assembly 200 across the magnetic contact 208 so as to generate a force to attract other ferromagnetic materials toward or away from the magnetic contact 208 in a vertical direction with respect to the EPM assembly 200.

Figure 2B:
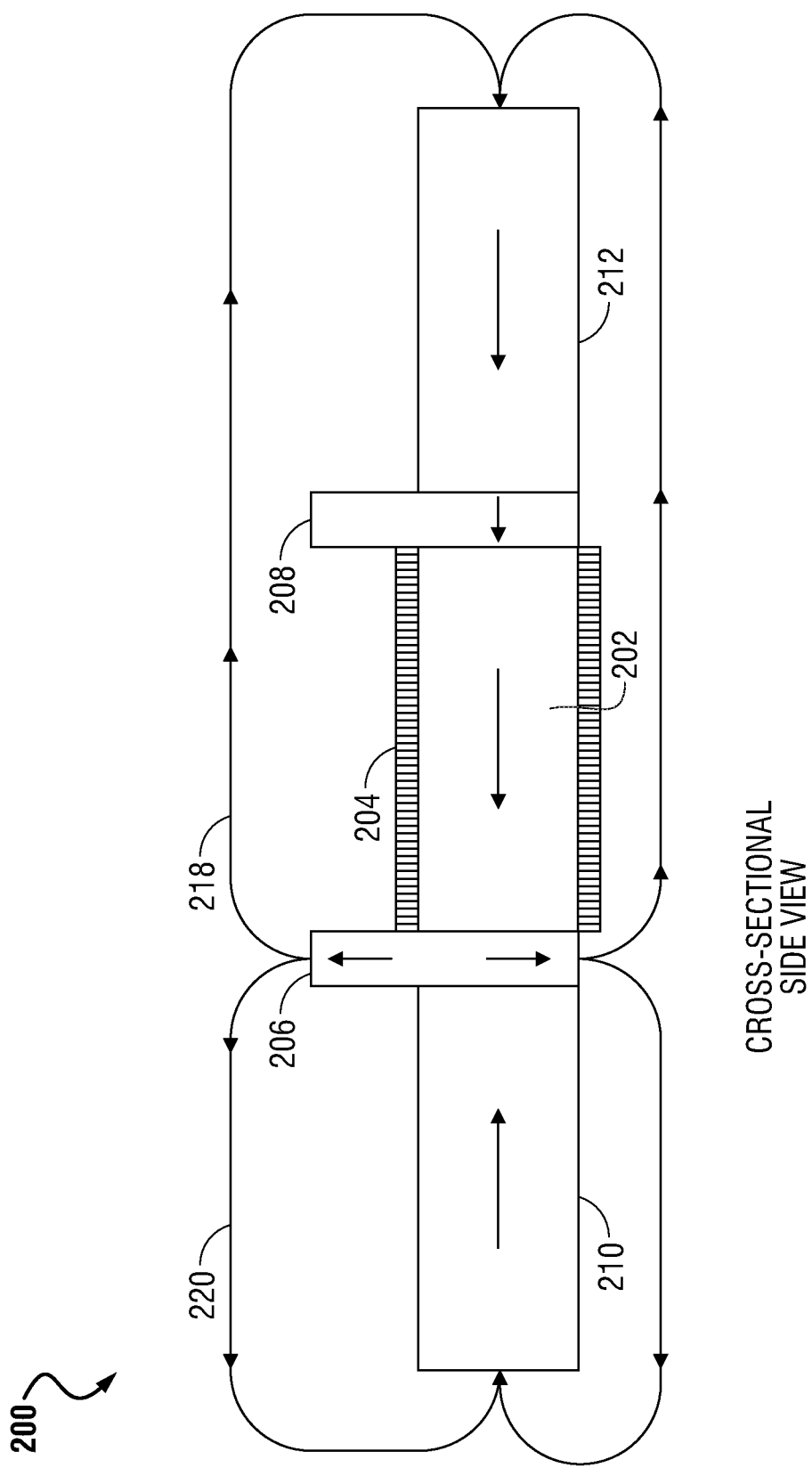
FIG. 2B is a cross-sectional side view of a dual-contact EPM assembly generating a magnetic field propagating through a second ferromagnetic contact according to an embodiment of the present disclosure.

FIG. 2B is a cross-sectional side view of a dual-contact EPM assembly generating a magnetic field propagating perpendicularly to the dual-contact EPM assembly through a second ferromagnetic contact to the left of a low-coercivity magnet according to an embodiment of the present disclosure. As described herein, the electropermanent magnet control system in an embodiment may dictate the low-coercivity magnetic field polarity by controlling the direction of the current applied to the conductive wire.

For example, the EPM control system in an embodiment illustrated by FIG. 2B may apply a current pulse to the wire 204 in the opposite direction as the current was applied in the embodiment shown in FIG. 2A. This may reverse the polarity of the low-coercivity magnet 202, such that the north pole of the magnetic field generated by the low-coercivity magnet 202 is on the left-hand side of the low-coercivity magnet 202, adjacent to magnetic contact 206. Thus, the magnetic field generated by the low-coercivity magnet 202 may have poles that line up with the high-coercivity magnet 212, such that these magnetic fields combine to form a combined magnetic field 218. Because the north pole of the high-coercivity magnet 212 field is located adjacent the south pole of the low-coercivity magnet 202 in an embodiment, the magnetic field 218 may be propagated horizontally through the magnetic contact 208. As such, the magnetic field 218 may not generate any magnetic force to attract other ferromagnetic materials toward or away from the magnetic contact 208 perpendicularly with respect to the EPM assembly 200.

The north pole of the magnetic field generated by the low-coercivity magnet 202 in an embodiment shown in FIG. 2B may be situated adjacent the north pole of the magnetic field 220 generated by the high-coercivity magnet 210. Because the poles of these adjacent magnetic fields 218 and 220 are in opposite configurations, neither of these fields 218 or 220 may propagate horizontally through the magnetic contact 206. Rather, both the magnetic fields 218 and 220 may propagate vertically or perpendicularly with respect to the top surface of the EPM assembly 200 across the magnetic contact 206 so as to generate a force to attract other ferromagnetic materials toward or away from the magnetic contact 206 in a vertical direction or perpendicularly with respect to the top surface of the EPM assembly 200. Thus, by controlling the direction in which the current pulse is applied to the coil 204 in an embodiment, the EPM control system in an embodiment may cause one of two magnetic contacts 206 and 208 to attract a ferromagnetic material in a vertical direction or perpendicularly with respect to the EPM assembly 200, while simultaneously disabling the ability of the other magnetic contact 206 or 208 to do so.

Figure 3A:
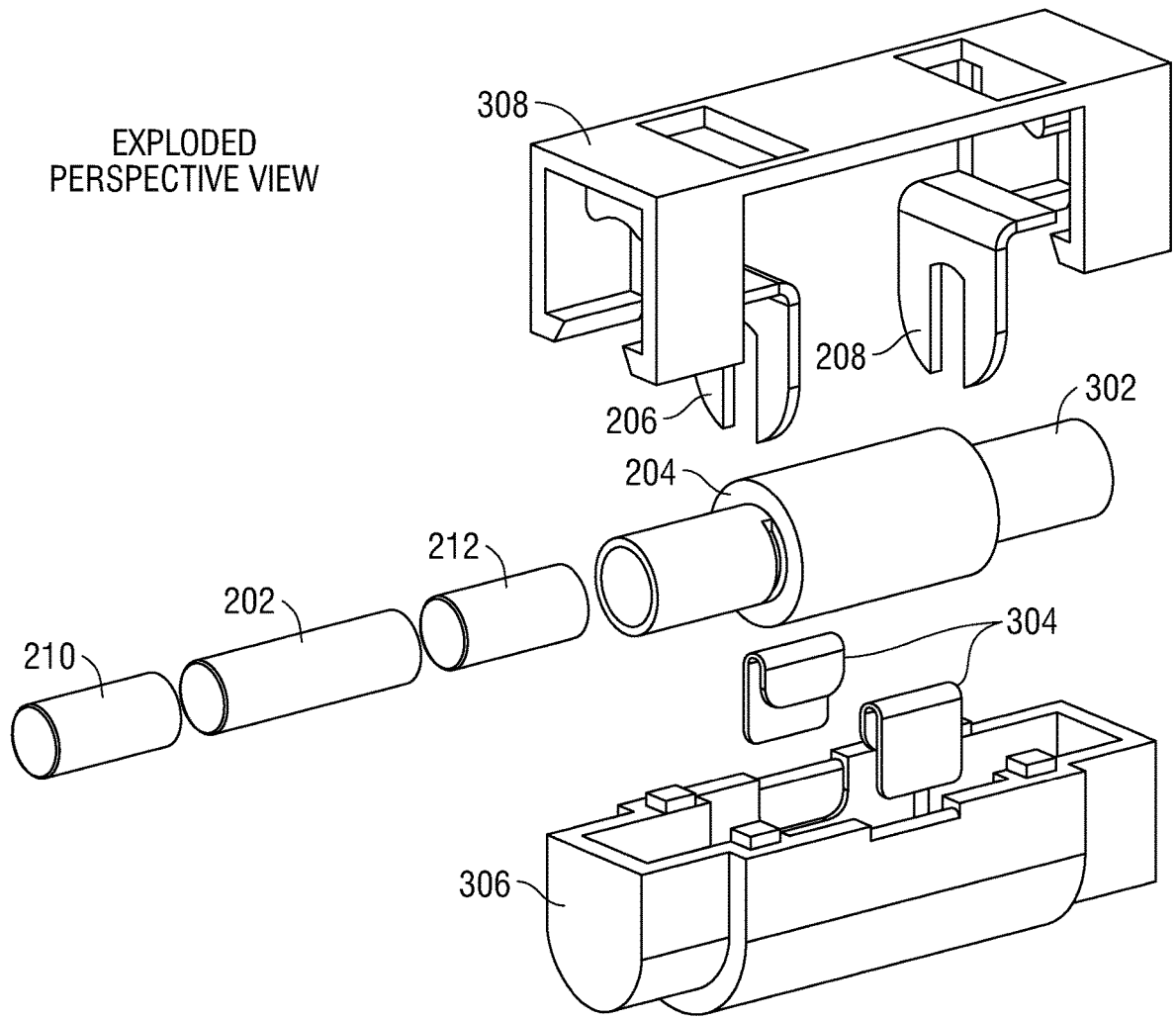
FIG. 3A is an exploded, perspective view of a dual-contact EPM housing assembly according to an embodiment of the present disclosure.

FIG. 3A is an exploded, perspective view of a dual-contact EPM housing assembly generating a magnetic field passing through one of two ferromagnetic contacts according to an embodiment of the present disclosure. The dual-contact EPM housing assembly 300 may house the dual-contact EPM assembly described above with reference to FIG. 2. For example, the high-coercivity magnet 212, low-coercivity magnet 202, and high-coercivity magnet 210 in an embodiment may be inserted into an alignment sleeve 302 comprised of non-ferromagnetic material. For example, alignment sleeve 302 may be comprised of a plastic material. The material composition of the alignment sleeve 302 in an embodiment may also be an electrically conductive material, such as aluminum. The alignment sleeve 302 may include two openings through which the magnetic contacts 206 and 208 may be partially inserted such that the magnetic contact 206 comes into contact with both the high-coercivity magnet 210 and the low-coercivity magnet 202, and such that the magnetic contact 208 comes into contact with both the low-coercivity magnet 202 and the high-coercivity magnet 212.

Upon the partial insertion of magnetic contacts 206 and 208 and total insertion of magnets 202, 210, and 212 within the alignment sleeve 302 in an embodiment, an electrically conductive wire 204 may be coiled around the portion of the alignment sleeve 302 housing the low-coercivity magnet 202. For example, the coil 204 may be disposed around the circumference of the alignment sleeve 302, between the inserted magnetic contacts 206 and 208. In other embodiments, the coil 204 may enclose only a portion of the low-coercivity magnet 202, or may also wrap completely or partially around either or both the high-coercivity magnets 210 and 212. The alignment sleeve 302 housing the magnets 202, 210, and 212, as well as the electrically conductive coil of wire 204 may be inserted within a housing 306, which may be comprised of a non-ferrous material. For example, housing 306 may be comprised of aluminum. In other embodiments, the housing 306 may be comprised of a non-ferrous and electrically non-conductive material, such as a plastic.

Two or more coil electrical contacts 304 may also be placed within housing 306 such that each of the coil electrical contacts 304 makes electrically conductive contact with the coil 204. Further, the coil electrical contacts 304 in an embodiment may make such contact with opposite ends of the coil of conductive wire 204 with respect to one another. Each coil electrical contact 304 in an embodiment may further be operably connected to a microcontroller, power source, or other device capable of directing the delivery of current to the coil electrical contacts 304. For example, each of the coil electrical contacts 304 in an embodiment may be operably connected to a microcontroller or other processor executing control instructions of the EPM control system. As described herein, the EPM control system in an embodiment may control the polarity of the low-coercivity magnet 202 by controlling the direction of current applied to the coil 204. For example, the low-coercivity magnet 202 may have a first polarity when current is applied to one of the coil electrical contacts 304, and an opposite polarity when current is applied to the other of the coil electrical contacts 304.

A housing lid 308 may be placed atop the alignment sleeve 302, coil 204, and housing 306 in an embodiment. The housing lid 308 in an embodiment may further include two or more openings through which the magnetic contacts 206 and 208 may be partially disposed upon integration of the housing lid 308 and the housing 306. The housing lid 308 may be comprised of a material similar to the material of the housing 306 such as aluminum or plastic. For example, the housing lid 308 may be comprised of a non-ferrous and electrically non-conductive material, such as a plastic. The housing lid 308 may be fixed to the housing 306.

Figure 3B:
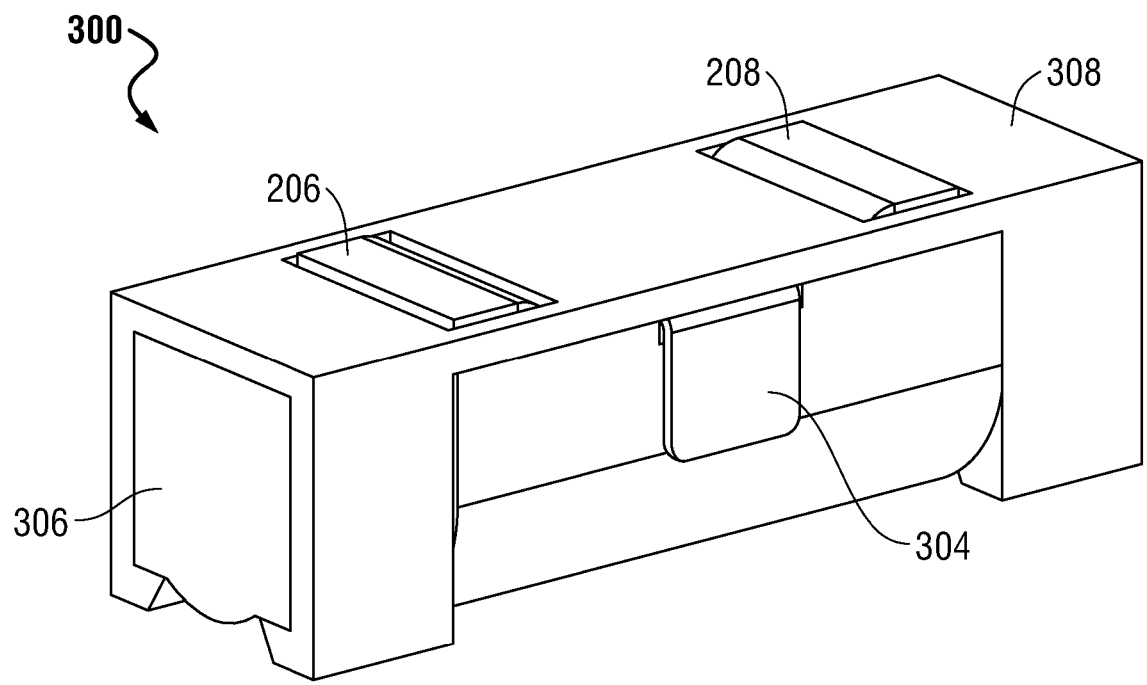
FIG. 3B is a perspective view of an integrated dual-contact EPM housing assembly according to an embodiment of the present disclosure.

FIG. 3B is a perspective view of an integrated dual-contact EPM housing assembly generating a magnetic field passing through one of two ferromagnetic contacts according to an embodiment of the present disclosure. Upon integration of the housing lid 308 with the housing 306, the coil electrical contacts (e.g., 304) may be operably connected to the microcontroller or other processor executing instructions of the EPM control system in an embodiment. Current delivered to either of the coil electrical contacts 304 in an embodiment may be applied via the coil electrical contacts to the electrically conductive wire (not shown) coiled around the alignment sleeve (not shown) disposed within the housing 306. The polarity of a low-coercivity magnet (not shown) disposed within the housing 306 may be altered in an embodiment by the EPM control system by switching between the application of current from one coil electrical contact 304 to the other coil electrical contact (not shown), or vice versa.

As described herein, by controlling the direction in which the current pulse is applied to the coil electrical contacts in an embodiment, the EPM control system in an embodiment may cause one of two magnetic contacts 206 and 208 to attract a ferromagnetic material in a vertical direction with respect to or perpendicularly from the top surface of the EPM assembly housing 300, while simultaneously disabling the ability of the other magnetic contact 206 or 208 to do so. For example, by applying a current to the coil electrical contact 304 in an embodiment, the EPM control system may cause magnetic contact 206 to propagate a magnetic field that attracts ferromagnetic material situated above the dual-contact EPM assembly housing 300 downward toward the magnetic contact 206. In such a scenario, the magnetic contact 208 may not propagate any magnetic field perpendicular to the EPM assembly housing 300, and can be said to be magnetically neutral (e.g., neither attracts or repels ferromagnetic material). As another example, by applying a current to the other coil electrical contact (not shown) on the back side of the dual-contact EPM housing assembly in an embodiment, the EPM control system may cause magnetic contact 208 to propagate a magnetic field that similarly attracts ferromagnetic material, while the magnetic contact 206 may not propagate any magnetic field perpendicular to the EPM assembly housing 300, and can be said to be magnetically neutral (e.g., neither attracts or repels ferromagnetic material). Thus, the application of current to either coil electrical contact in an embodiment may cause one of the magnetic contacts 206 and 208 to attract ferromagnetic material perpendicular to the top surface of the EPM assembly housing 300 while the other remains magnetically neutral.

Figure 4A:
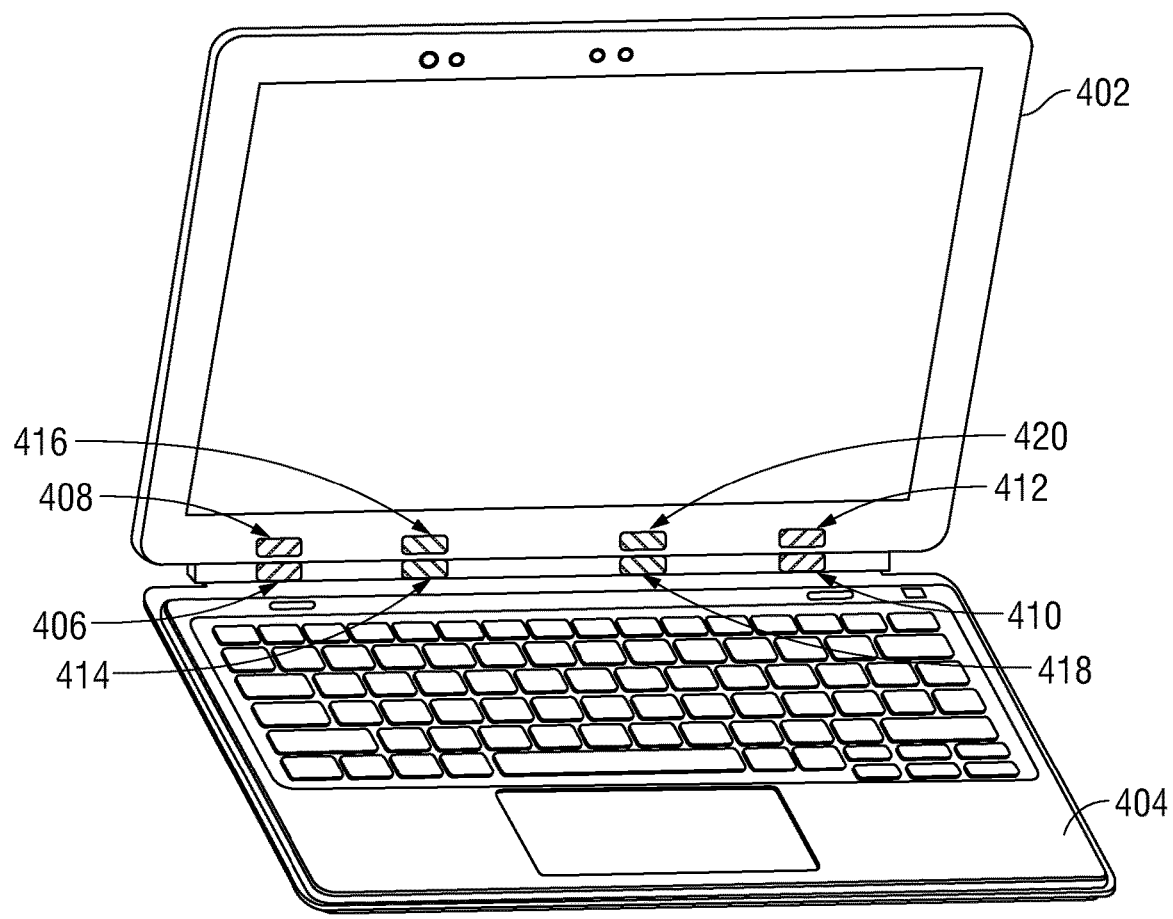
FIG. 4A is a perspective view of a detachable display chassis in an attached position according to an embodiment of the present disclosure.

FIG. 4A is a perspective view of a detachable display chassis in an attached position maintained by attractive force of one or more EPMs in an ON state according to an embodiment of the present disclosure. As described herein, user desire for ease of mobility has driven information handling system design toward mobile systems that allow for tablet configurations, or the ability to detach the video display from the keyboard. For example, existing information handling systems may include a display chassis 402 housing a video display, and a base chassis 404 housing a keyboard, where the display chassis 402 may be detached from the base chassis 404 entirely. Information handling systems housed within such detachable chasses may be referred to herein as convertible information handling systems.

Some existing systems employ permanent magnets to operably attach the base chassis 404 and the display chassis 402 using enough force to maintain connection during use in a laptop mode, but the user may easily detach them when desired, and this may result in inadvertent detachment or unstable attachment. However, use of EPMs to supplement the selective force of attraction of the permanent magnets may improve function of the previous systems. For example, a left base chassis permanent magnet 406, and right base chassis permanent magnet 410 may be housed within the base chassis 404 along the edge of the base chassis that is operably connected to the display chassis 402 when the chasses are operably connected to one another (e.g. in a laptop configuration). A plurality of permanent magnets or ferromagnetic material attracted to the permanent magnets 406 and 410 may be housed within the display chassis 402 in an embodiment. For example, left display chassis permanent magnet 408 and right display chassis permanent magnet 412 may be housed within the display chassis 402 along the side where the display chassis 402 operably connects to the base chassis 404 when the chasses are connected to one another. The left base chassis permanent magnet 406 in an embodiment may propagate a magnetic field that attracts the left display chassis permanent magnet 408. Similarly, the right base chassis permanent magnet 410 in an embodiment may propagate a magnetic field that attracts the right display chassis permanent magnet 412. In other embodiments, the left display chassis permanent magnet 408 and right display chassis permanent magnet 412 may be replaced by ferromagnetic material that is attracted toward the base chassis magnets 406 and 410, respectively. In still other embodiments, the left base chassis permanent magnet 406 and right base chassis permanent magnet 410 may be replaced by ferromagnetic material that is attracted toward the display chassis magnets 408 and 412, respectively. The magnetic attraction between these permanent magnets, or between these permanent magnets and ferromagnetic materials may operate to attach the base chassis 404 to the display chassis 402, until an outside force overcomes these magnetic attractions to detach the display chassis 402 from the base chassis 404.

The electropermanent magnets may be used (alone or in combination with existing permanent magnets) according to embodiments of the present disclosure. For example, EPMs 414, 416, 418, or 420 may be used to operably attach the base chassis 404 and the display chassis 402 such that the chasses 402 and 404 do not tend to inadvertently disconnect during use in a laptop configuration, but the user may easily detach them when desired by selecting activation or pre-activation of the EPM. Supplementing the permanent magnets 406-412 with EPMs in one example embodiment may result in a more reliable attachment between the base chassis 404 and the display chassis 402. However, use of just EPMS or of dual-contact EPMs according to various embodiments herein is contemplated at 414, 416, 418, or 420. For example, a left base chassis EPM assembly 414, and right base chassis EPM assembly 418 may be housed within the base chassis 404 along the edge of the base chassis that is operably connected to the display chassis 402 when the chasses are operably connected to one another. A plurality of EPMs or ferromagnetic material attracted to the EPM assemblies 414 and 418 may be housed within the display chassis 402 in an embodiment. For example, left display chassis EPM assembly 416 and a right display chassis EPM assembly 420 may be housed within the display chassis 402 in an embodiment along the side where the display chassis 402 operably connects to the base chassis 404 when the chasses are connected to one another. The left base chassis EPM assembly 414 in an embodiment may propagate a magnetic field that attracts the left display chassis EPM assembly 416. Similarly, the right base chassis EPM assembly 418 in an embodiment may propagate a magnetic field that attracts the right display chassis EPM assembly 420.

As described in some embodiments a dual-contact EPM may be used at 414 or 418 such that switching the contacts may attract or not attract corresponding elements 416 and 420 in the display chassis. In other embodiments the element 416 and 420 may include attracting and repelling elements aligned with the dual contacts. For example, the left base chassis EPM assembly 414 in such an embodiment may be a dual-contact EPM housing assembly, and the left display chassis EPM assembly 416 may comprise a single EPM assembly situated adjacent a ferromagnetic contact. The ferromagnetic contact may be aligned with one of the dual-contacts within the left base chassis EPM assembly 414, while the single EPM assembly within 416 is aligned with the other of the dual-contacts within the left base chassis EPM assembly 414. The EPm control system in such an embodiment may place the dual-contact EPM housing 414 in an attractive state by causing the magnetic contact within the dual-contact EPM housing 414 that is aligned with the ferromagnetic contact within element 416 to propagate a magnetic field perpendicularly with respect to the dual-contact EPM housing 414. The ferromagnetic contact in such an embodiment may then be attracted to the magnetic contact within the dual-contact EPM housing assembly 414 with which it is aligned.

In other embodiments, the left display chassis EPM assembly 416 and right display chassis EPM assembly 420 may be replaced by ferromagnetic material that is attracted toward the base chassis EPM magnets at 414 and 418, respectively. The magnetic attraction between these EPMs, or between these EPMs and ferromagnetic materials may operate to attach the base chassis 404 to the display chassis 402, until the EPMs are placed in an OFF state. In other embodiments, the dual-contact EPMs may be disposed at 416 and 420 in the display chassis to attract or not attract or attract/repel elements at 414 and 418.

In some embodiments, the EPM assemblies 414-420 may comprise a single low-coercivity magnet in combination with a single high-coercivity magnet. The EPM control system in such an embodiment may be capable of controlling the polarity of the low-coercivity magnet such that it either combines with or negates the magnetic field generated by an adjacent high-coercivity magnet. The EPM assemblies 414-420 may be placed in an ON state by aligning the polarities of the low-coercivity and high-coercivity magnetic fields, and may be placed in an OFF state by setting the polarity of the low-coercivity magnetic field opposite the polarity of the high-coercivity magnetic field.

In other embodiments, one or more of the EPM assemblies 414-420 may include a dual-contact EPM housing assembly. For example, one or more of the EPM assemblies 414-420 may include a dual-contact EPM housing assembly described with reference to FIGS. 3A and 3B, in which one of two magnetic contacts in the housing is attracting ferromagnetic material perpendicular to the dual-contact EPM housing assembly, and the other magnetic contact remains magnetically neutral in that direction. In an example embodiment, the left base chassis EPM assembly 414 may include a dual-contact EPM housing assembly having a first magnetic contact that attracts a ferromagnetic material housed within the display chassis 402 when the EPM control system places the EPM dual-contact EPM housing assembly in a first of the two available states (e.g., the first magnetic contact is "ON" and the second magnetic contact is "OFF"). The ferromagnetic material attracted by the EPM assembly 414 may be housed in the display chassis 402 such that the ferromagnetic material is situated directly atop the attractive first magnetic contact of the EPM assembly 414 when the display chassis 402 and base chassis 404 are operably connected to one another. The portion of the display chassis 402 situated directly atop the second magnetic contact of the EPM assembly 414 in such an embodiment may be comprised of non-ferromagnetic material. The EPM control system in such an embodiment may switch the dual-contact EPM housing assembly to a second of the two available states, in which the first magnetic contact is "OFF" and the second magnetic contact is "ON") when the user wishes to detach the display chassis 402 from the base chassis 404. Because the second magnetic contact is not situated adjacent a ferromagnetic material housed within the display chassis 402, the dual-contact EPM housing assembly may not cause the display chassis 402 to attach to the base chassis 404 in such an embodiment when the dual-contact EPM is placed in such a second state.

The electropermanent magnetic control system in an embodiment may place the EPM in an OFF state, or switch the state of a dual-contact EPM in other embodiments based on received input. In one embodiment, turning off the EPMs or reducing the EPM magnetic force allows detachment. In another example embodiment, in which each of 414-420 comprises an EPM assembly, each pair of aligned EPM assemblies (e.g., 414 and 416, or 418 and 420) may be switched from a state in which they attract one another to a state in which they repel one another. In yet another embodiment, the EPM control system in an embodiment may place the EPM in an OFF state such that the display chassis 402 and base chassis 404 are operably connected by the permanent magnets 406-412, but not by the EPM assemblies 414-420 based on received user input indicating the user would like to detach the display chassis 402 from the base chassis 404. Such received user input in various embodiments may take the form of input entered by the user via a keyboard, mouse, or button/switch type mechanism housed within the base chassis 404 or the display chassis 402. In another aspect, such user input may take the form of a voice command detected by a microphone of the information handling system, an orientation of the display chassis 402 with respect to the base chassis 404 (e.g., placement in a tablet configuration) detected by a gyroscope or hall effect sensor of the information handling system.

Figure 4B:
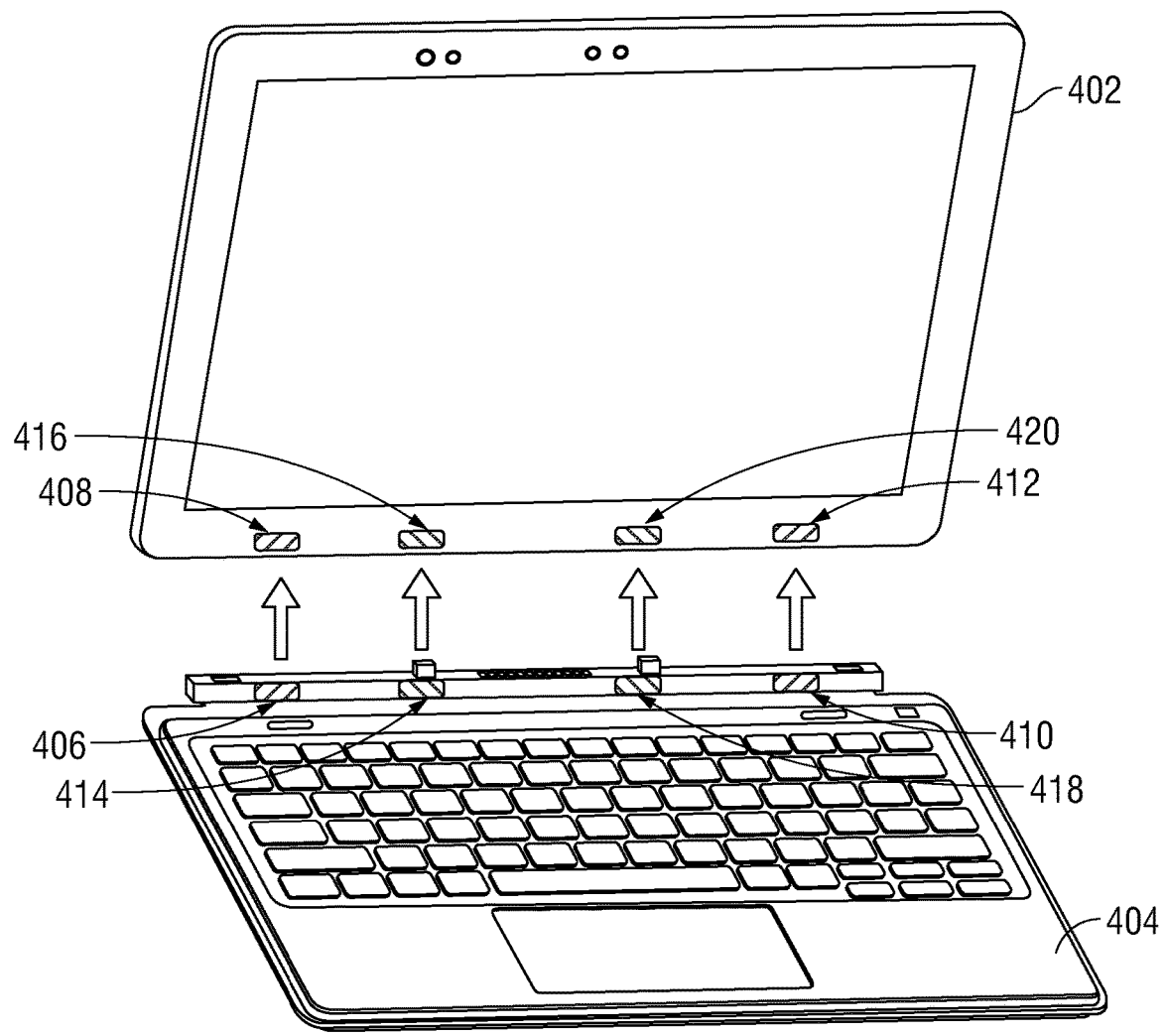
FIG. 4B is a perspective view of a detachable display chassis in a detached position according to an embodiment of the present disclosure.

FIG. 4B is a perspective view of a detachable display chassis in a detached position in which one or more EPMs are placed in an OFF state according to an embodiment of the present disclosure. As described herein, a user may provide input to the EPM control system indicating a desire to detach the display chassis 402 from the base chassis 404 via a plurality of mechanisms (e.g. pressing a button, flipping a switch, verbal command, placing the display chassis 402 and base chassis 404 in tablet configuration) in an embodiment. Upon receipt of such a user command in an embodiment, the EPM control system in an embodiment may place the EPM assemblies within the display chassis 402 or base chassis 404 in an OFF state.

For example, the EPM control system in an embodiment in which the left base chassis EPM assembly 414 propagates a magnetic field that attracts the left display chassis EPM assembly 416, and the right base chassis EPM assembly 418 propagates a magnetic field that attracts the right display chassis EPM assembly 420, the EPM control system may place one or both of each pair of the EPM assemblies 414-420 in an OFF state such that none of the EPM assemblies 414-420 attract one another.

In another aspect of such an embodiment, the EPM control system may place one of each pair of the EPM assemblies 414-420 in a state such that each pair is repelled from one another. For example, the left base chassis EPM assembly 414 in such an embodiment may be a dual-contact EPM housing assembly, and the left display chassis EPM assembly 416 may comprise a single EPM assembly situated adjacent a ferromagnetic contact. As described herein, the ferromagnetic contact within the left display chassis EPM assembly 416 in such an embodiment may be attracted to the magnetic contact within the dual-contact EPM housing assembly 414 with which it is aligned, when the EPM control system places the dual-contact EPM housing 414 in an attractive state. The single EPM assembly within the left display chassis EPM assembly 416 may have a magnetic field with poles that are opposite the poles of the magnetic field propagated by the dual-contact EPM housing assembly 414 in such an embodiment. The EPM control system may place the dual-contact EPM housing assembly 414 in a repelling state by propagating a magnetic field having opposite poles as the left display chassis EPM assembly 416 magnetic field through the magnetic contact of the dual-contact EPM housing assembly 414 aligned with the single EPM assembly within the left display chassis EPM assembly 416. This may cause the EPM assemblies 414 and 416 to repel one another.

In another embodiment in which the left display chassis EPM assembly 416 and right display chassis EPM assembly 420 are replaced by ferromagnetic material that is attracted toward the base chassis magnets 414 and 418, the EPM control system may place the base chassis magnets 414 and 418 in an OFF state such that they do not attract the ferromagnetic material located in place of the EPM assemblies 416 and 420. In another embodiment in which the left base chassis EPM assembly 414 and right base chassis EPM assembly 418 are replaced by ferromagnetic material that is attracted toward the display chassis magnets 416 and 420, the EPM control system may place the display chassis magnets 416 and 420 in an OFF state such that they do not attract the ferromagnetic material located in place of the EPM assemblies 414 and 418.

In still other embodiments, in which one or more of the EPM assemblies 414-420 comprises a dual-contact EPM housing assembly, the EPM control system may switch the EPM assemblies 414-420 from a first, magnetically attractive state, to a second, magnetically neutral state. For example, the left base chassis EPM assembly 414 in such an embodiment may comprise a dual-contact EPM housing, and the left display chassis EPM assembly 416 may be replaced by a ferromagnetic material located directly above only one of the two magnetic contacts of the dual-contact EPM housing 414 when the display chassis 402 is operably connected or attached to the base chassis 404. The magnetic contact located directly below the ferromagnetic material may attract the ferromagnetic material when the left base chassis EPM assembly 414 in such an embodiment is placed in a first magnetically attractive state. The EPM control system in such an embodiment may switch the polarity of a low-coercivity magnetic within the dual-contact assembly 414, placing the dual-contact assembly 414 in a second, magnetically neutral state upon receipt of a user input indicating user desire to detach the display chassis 402 from the base chassis 404. When placed in such a second, magnetically neutral state in such an embodiment, the magnetic contact located directly beneath the ferromagnetic material may become magnetically neutral and cease to attract the ferromagnetic material.

In each of these embodiments, upon receipt of user input indicating user desire to detach the display chassis 402 from the base chassis 404, the EPM assemblies 416 and 420 (or ferromagnetic material) within the display chassis 402 may cease to attract or to be attracted toward the EPM assemblies 414 and 418 (or ferromagnetic material) within the base chassis 404. In such an embodiment, upon placement of the one or more EPM assemblies 414-420 in such an OFF state, the combined magnitude of forces operably attaching the display chassis 402 to the base chassis 404 may decrease markedly. In one embodiment, this may allow the user to overcome the attractive forces between the permanent magnets 406 and 408 and between the permanent magnets 410 and 412, respectively when those are used, so as to detach the base chassis 404 from the display chassis 402.

Figure 5A:
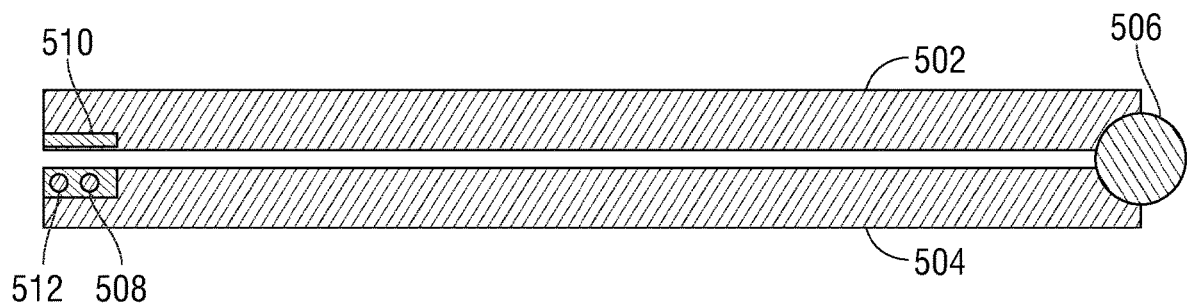
FIG. 5A is a cross-sectional side view of a dual-magnet chasses closure assembly in a closed configuration according to an embodiment of the present disclosure.

FIG. 5A is a cross-sectional side view of a dual-magnet chasses closure assembly in a closed configuration in which an EPM is in an ON state according to an embodiment of the present disclosure. As described herein, an EPM housed within a base chassis 504 may attract a portion of a display chassis 502 located opposite a hinge 506 operably connecting the chasses 502 and 504 toward a portion of the base chassis 504 opposite the hinge 506. The hinge 506 in some embodiments may comprise a simple torque hinge providing a spring-loaded torque tending to rotate the display chassis 502 away from the base chassis 504. For example, the attractive EPM 512 placed in an ON state may attract the ferromagnetic contact 510. Such an attractive force in an embodiment may cause the chasses to remain in the closed configuration. The base chassis 504 in such an embodiment may further house a permanent repelling magnet 508, which may act consistently to repel the ferromagnetic contact 510. The attractive force of the attractive EPM 512 placed in an ON state may be greater in such an embodiment than the repelling force of the permanent repelling magnet 508.

Figure 5B:
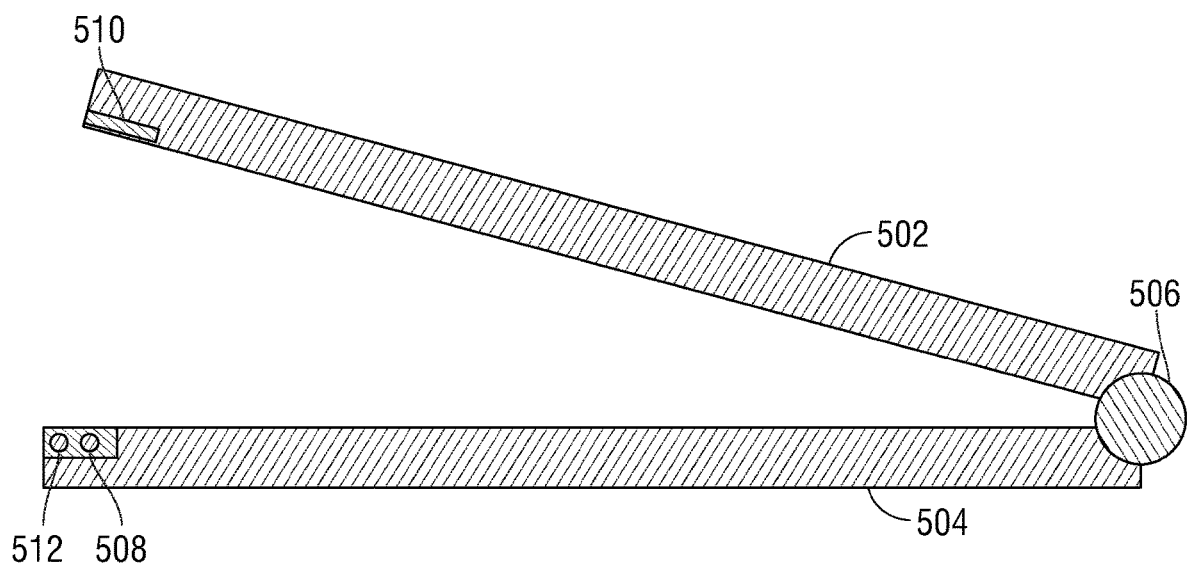
FIG. 5B is a cross-sectional side view of a dual-magnet chasses closure assembly in which an EPM is in an OFF state according to an embodiment of the present disclosure.

FIG. 5B is a cross-sectional side view of a dual-magnet chasses closure assembly in which an EPM is in an OFF state and a permanent magnet repels a display chassis from a base chassis according to an embodiment of the present disclosure. The EPM control system in an embodiment may place the EPM 512 in an OFF state in response to user input indicating the user would like to open the chasses into a laptop or tablet configuration. Such received user input in an embodiment may take the form of input entered by the user via a keyboard, mouse, or button/switch type mechanism housed within the base chassis 504 or the display chassis 502. In another aspect, such user input may take the form of a voice command detected by a microphone of the information handling system, a thumbprint scanner, a signal transmitted via a microchip housed in a peripheral device (e.g., USB device, mobile information handling system, key fob) of the information handling system. Such mechanisms may require the user to provide some form of positive identification before transmitting user input to the EPM control system to open the chasses in an embodiment. Other embodiments contemplate other types of security scanners/measures. For example, the information handling system may also comprise an iris scanner, or facial recognition methods.

Upon receipt of such a user instruction, the EPM control system in an embodiment may place the EPM 512 in an OFF state, such that it no longer attracts the ferromagnetic contact 510. In such a scenario, the permanent repelling magnet 508 may continue to repel the ferromagnetic contact 510. In the absence of a magnetic field generated by the EPM 512, the permanent repelling magnet 508 may repel the ferromagnetic contact 510, causing the portion of the display chassis 502 located opposite the hinge 506 to rotate about the hinge 506, away from the portion of the base chassis 504 located opposite the hinge 506. The gap formed between the ferromagnetic contact 510 and the permanent repelling magnet 508 upon such a rotation may be sufficiently large for a user to insert a finger or thumb therein, making further manual rotation of the display chassis 502 away from the base chassis 504 about hinge 506 easier.

Figure 5C:
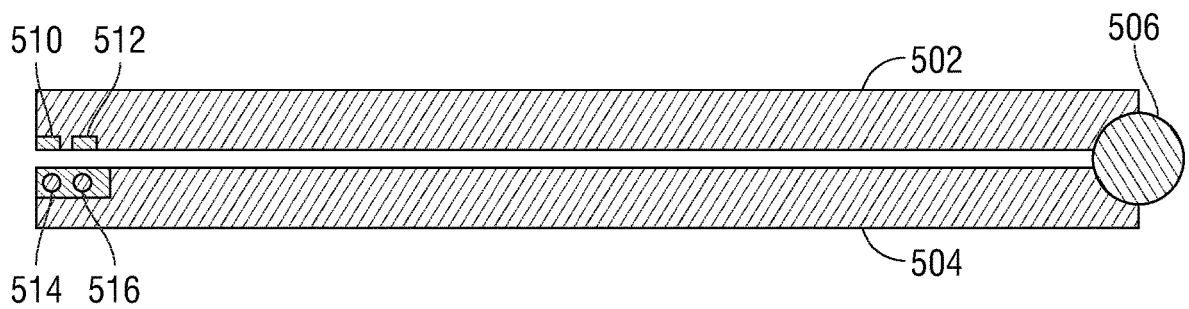
FIG. 5C is a cross-sectional side view of a dual-magnet chasses closure assembly in a closed configuration according to an embodiment of the present disclosure.

FIG. 5C is a cross-sectional side view of a dual-magnet chasses closure assembly in a closed configuration in which an EPM is in an attractive state according to an embodiment of the present disclosure. A dual-contact EPM assembly housed within a base chassis 504 may be used to attract a portion of a display chassis 502 located opposite a hinge 506 operably connecting the chasses 502 and 504 toward a portion of the base chassis 504 opposite the hinge 506. As described herein, a dual-contact EPM assembly may have two magnetic contacts, and may be capable of operating in a first state in which the first of the two magnetic contacts 514 propagates a magnetic field and the second of the magnetic contacts 516 is magnetically neutral. The dual-contact EPM assembly in such an embodiment may also be capable of operating in a second state in which the second of the two magnetic contacts 516 propagates a magnetic field and the first of the magnetic contacts 514 is magnetically neutral perpendicularly to the top surface of the base chassis 504. In other words, the EPM control system in such an embodiment may cause the dual-EPM assembly to switch between the first magnetic contact 514 propagating a magnetic field to attract ferromagnetic contact 510, and the second magnetic contact 516 propagating a magnetic field to repel EPM 512.

A ferromagnetic contact 510 in such an embodiment may be housed within the display chassis 502, and may be located directly above the first magnetic contact 514 of the dual-EPM contact assembly when the base chassis 504 and display chassis 502 are placed in a closed configuration. The ferromagnetic contact 510 may have a polarity such that the magnetic field propagated by the first magnetic contact 514 when the dual-EPM assembly is placed in its first state attracts the ferromagnetic contact 510. An EPM 512 may be housed within the display chassis 502 in an embodiment, and may be located directly above the second magnetic contact 516 of the dual-EPM contact assembly when the base chassis 504 and display chassis 502 are placed in a closed configuration. The EPM 512 may have a polarity such that the magnetic field propagated by the second magnetic contact 516 when the dual-EPM assembly is placed in its second state repels the EPM 512.

In such an embodiment, a dual-EPM assembly 514 may be placed in an attractive polarity position when the EPM control system places the dual-EPM assembly in its first state, causing the first magnetic contact 514 to propagate a magnetic field attracting the ferromagnetic contact 510. Such an attractive force in an embodiment may cause the chasses to remain in the closed configuration. In such an embodiment, when the first magnetic contact 514 propagates a magnetic field, the second magnetic contact 516 may remain magnetically neutral such that it does not repel the EPM 512. The attractive force between the first magnetic contact 514 and the ferromagnetic contact 510 in such an embodiment may be greater than the spring-loaded torque the hinge 506 exerts to separate the portion of the display chassis 502 located opposite the hinge 506 from the portion of the base chassis 504 located opposite the hinge 506 in some embodiments.

Figure 5D:
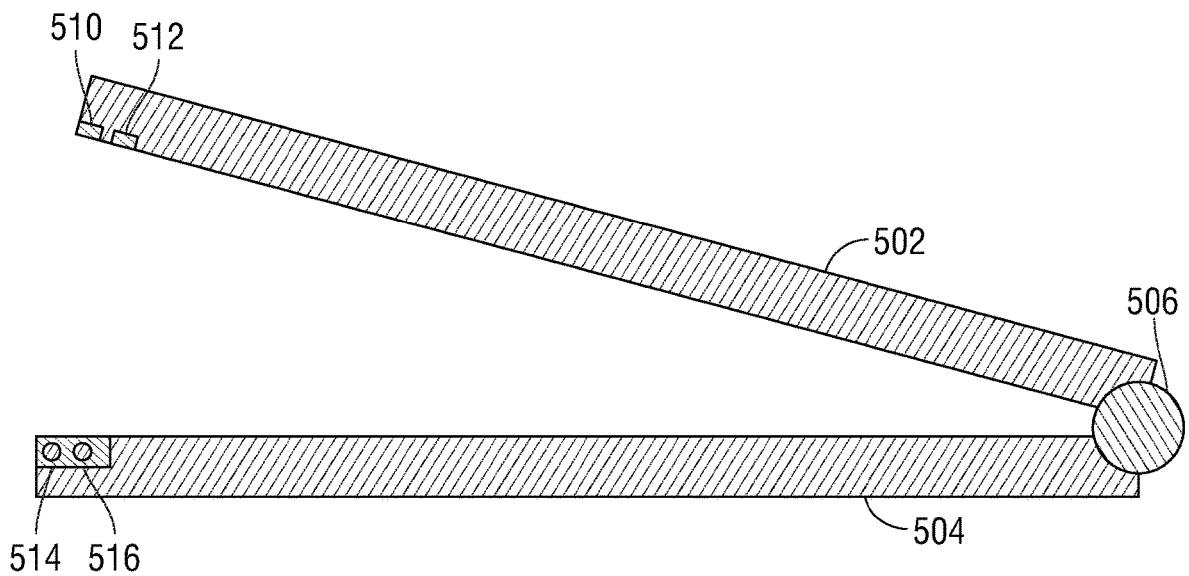
FIG. 5D is a cross-sectional side view of a dual-magnet chasses closure assembly in which an EPM is in a repelling state according to an embodiment of the present disclosure.

FIG. 5D is a cross-sectional side view of a dual-magnet chasses closure assembly in which an EPM is in a repelling state and acts to repel a display chassis from a base chassis according to an embodiment of the present disclosure. The EPM control system in an embodiment may place a dual-EPM assembly in a repelling polarity position in response to user input indicating the user would like to open the chasses into a laptop or tablet configuration. Such received user input in an embodiment may take the form of input entered by the user via a keyboard, mouse, or button/switch type mechanism housed within the base chassis 504 or the display chassis 502. In another aspect, such user input may take the form of a voice command detected by a microphone of the information handling system, a thumbprint scanner, a signal transmitted via a microchip housed in a peripheral device (e.g., USB device, mobile information handling system, key fob) of the information handling system. Such mechanisms may require the user to provide some form of positive identification before transmitting user input to the EPM control system to open the chasses in an embodiment. Other embodiments contemplate other types of security scanners/measures. For example, the information handling system may also comprise an iris scanner, or facial recognition methods.

Upon receipt of such a user instruction, the EPM control system in an embodiment may place the dual-EPM assembly in a second state in which the first magnetic contact 514 is magnetically neutral with respect to the ferromagnetic contact 510, and the second magnetic contact 516 propagates a magnetic field affecting EPM 512. As described herein, the EPM 512 in an embodiment may have a polarity opposite the magnetic field propagated by the second magnetic contact 516 when the dual-EPM assembly is placed in its second state, such that the second magnetic contact 516 magnetic field repels the EPM 512. This repelling force, alone or in combination with the spring-loaded torque of the hinge 506, may cause the portion of the display chassis 502 located opposite the hinge 506 to rotate about the hinge 506, away from the portion of the base chassis 504 located opposite the hinge 506. The gap formed between the display chassis 502 and the base chassis 504 upon such a rotation may be sufficiently large for a user to insert a finger or thumb therein, making further manual rotation of the display chassis 502 away from the base chassis 504 about hinge 506 easier.

Figure 5E:
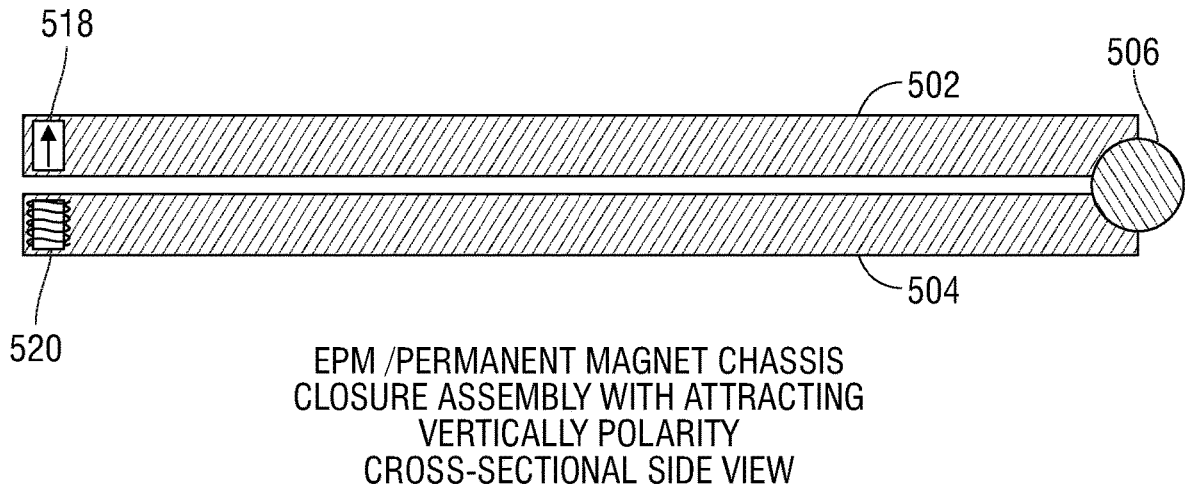
FIG. 5E is a cross-sectional side view of a single EPM chasses closure assembly in which a vertically-oriented, single EPM is in an attractive state according to an embodiment of the present disclosure.

FIG. 5E is a cross-sectional side view of a single EPM chasses closure assembly in a closed configuration in which a vertically-oriented, single EPM is in an attractive state according to an embodiment of the present disclosure. A vertically-oriented single EPM assembly 520 housed within a base chassis 504 may be used to attract a portion of a display chassis 502 located opposite a hinge 506 operably connecting the chasses 502 and 504 toward a portion of the base chassis 504 opposite the hinge 506. A vertically-oriented permanent magnet 518 in such an embodiment may be located directly above the single EPM 520 when the base chassis 504 and display chassis 502 are placed in a closed configuration. The polarity of such a single EPM 520 in an embodiment may be set by the EPM control system by applying a pulse of current through an electrically conductive wire coiled about a low-coercivity magnet within the single EPM 520. For example, the magnetic field of the single EPM 520 in such an embodiment may be capable of a first polarity having a magnetic north pole situated near the top surface of the base chassis 504 and a second polarity having a magnetic north pole situated near the bottom surface of the base chassis 504. The magnetic field of the permanent magnet 518 in such an embodiment may have a north pole situated near the top surface of the display chassis 502. In other words, the magnetic poles of the single EPM 520 and the permanent magnet 518 may be situated vertically with respect to one another.

The permanent magnet 518 within the display chassis 502, situated adjacent the single EPM 520 within the base chassis 504, may have a polarity such that the magnetic field propagated by the single EPM 520 lines up with the permanent magnetic field and attracts the permanent magnet 518 when the single EPM 520 is given the first polarity. Such an attractive force in an embodiment may cause the chasses 502 and 504 to remain in the closed configuration. The attractive force between the single EPM 520 and the permanent magnet 518 in such an embodiment may be greater than the spring-loaded torque the hinge 506 exerts to separate the portion of the display chassis 502 located opposite the hinge 506 from the portion of the base chassis 504 located opposite the hinge 506 in some embodiments.

Figure 5F:
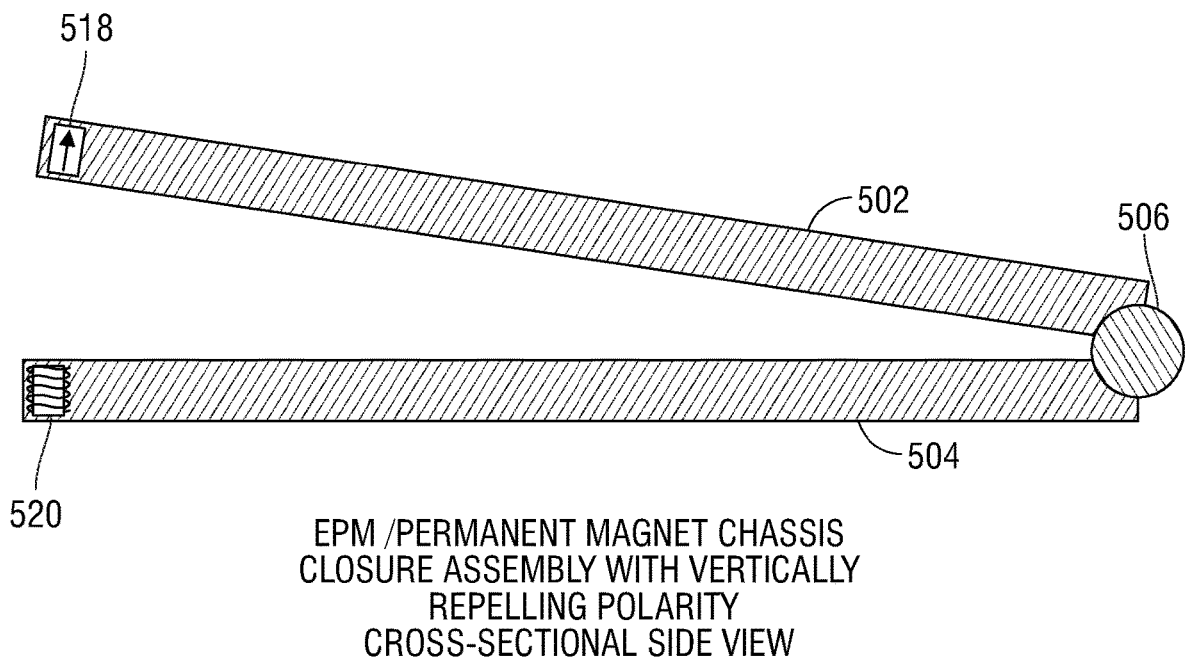
FIG. 5F is a cross-sectional side view of a single EPM chasses closure assembly in which a vertically-oriented, single EPM is in a repelling state according to an embodiment of the present disclosure.

FIG. 5F is a cross-sectional side view of a single EPM chasses closure assembly in an open configuration in which a vertically-oriented, single EPM is in a repelling state according to an embodiment of the present disclosure. The EPM control system in an embodiment may place a single EPM assembly 520 in a repelling polarity position in response to user input indicating the user would like to open the chasses 502 and 504 into a laptop or tablet configuration. Upon receipt of such a user instruction described above, the EPM control system in an embodiment may give the single EPM 520 within the base chassis 504 the second polarity having a north pole situated near the bottom surface of the base chassis 504, which may be opposite the polarity of the permanent magnet 518 within the display chassis 502 situated adjacent the single EPM 520 within the base chassis 504. Because their magnetic field polarities are opposite, the permanent magnet 518 and single EPM 520 in such an embodiment may repel one another. This repelling force, alone or in combination with the spring-loaded torque of the hinge 506, may cause the portion of the display chassis 502 located opposite the hinge 506 to rotate about the hinge 506, away from the portion of the base chassis 504 located opposite the hinge 506.

Figure 5G:
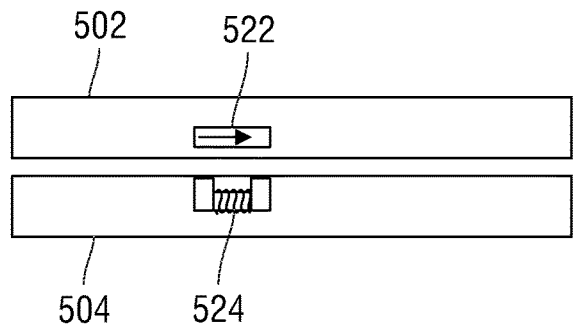
FIG. 5G is a front view of a single EPM chasses closure assembly in which a horizontally-oriented, single EPM is in an attractive state according to an embodiment of the present disclosure.

FIG. 5G is a front view of a single EPM chasses closure assembly in a closed configuration in which a horizontally-oriented, single EPM is in an attractive state according to an embodiment of the present disclosure. A horizontally-oriented single EPM assembly 524 housed within a base chassis 504 may be used to attract a portion of a display chassis 502 toward a portion of the base chassis 504. A horizontally-oriented permanent magnet 522 in such an embodiment may be located directly above the single EPM 524 when the base chassis 504 and display chassis 502 are placed in a closed configuration. The polarity of such a single EPM 524 in an embodiment may be set by the EPM control system by applying a pulse of current through an electrically conductive wire coiled about a low-coercivity magnet within the single EPM 524. For example, the magnetic field of the single EPM 524 in such an embodiment may be capable of a first polarity having a magnetic north pole situated nearer the left side of the base chassis 504 and a second polarity having a magnetic north pole situated nearer the left side of the base chassis 504. The magnetic field of the permanent magnet 522 in such an embodiment may have a north pole situated nearer the right side of the display chassis 502. In other words, the magnetic poles of the single EPM 524 and the permanent magnet 522 may be situated horizontally with respect to one another.

Figure 5H:
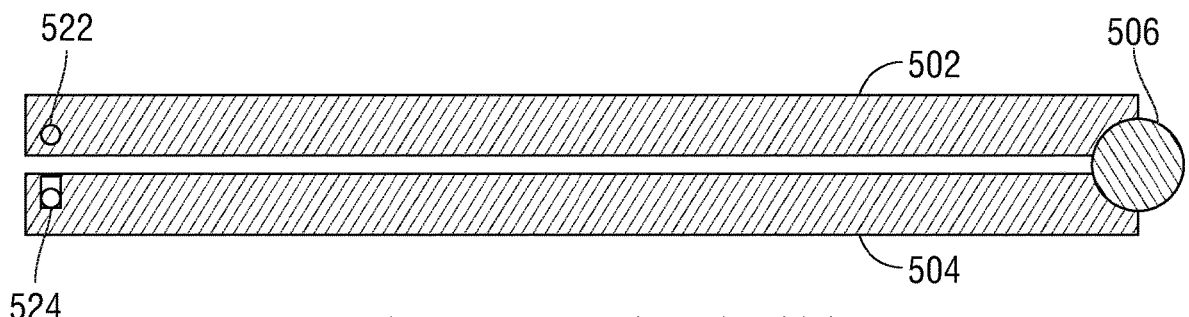
FIG. 5H is a cross-sectional side view of a single EPM chasses closure assembly in which a horizontally-oriented, single EPM is in an attractive state according to an embodiment of the present disclosure.

FIG. 5H is a cross-sectional side view of a single EPM chasses closure assembly in a closed configuration in which a horizontally-oriented, single EPM is in an attractive state according to an embodiment of the present disclosure. The permanent magnet 522 within the display chassis 502, situated adjacent the single EPM 524 within the base chassis 504, may have a polarity such that the magnetic field propagated by the single EPM 524 lines up with the permanent magnetic field and attracts the permanent magnet 522 when the single EPM 524 is given the first polarity. Such an attractive force in an embodiment may cause the chasses 502 and 504 to remain in the closed configuration. The attractive force between the single EPM 524 and the permanent magnet 522 in such an embodiment may be greater than the spring-loaded torque the hinge 506 exerts to separate the portion of the display chassis 502 located opposite the hinge 506 from the portion of the base chassis 504 located opposite the hinge 506 in some embodiments.

Figure 5J:
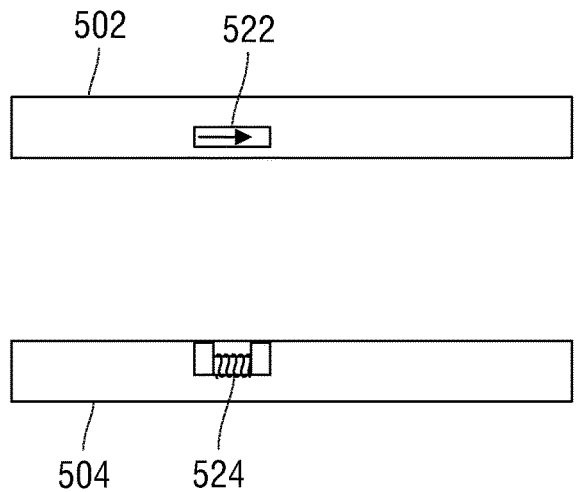
FIG. 5J is a front view of a single EPM chasses closure assembly in which a horizontally-oriented, single EPM is in a repelling state according to an embodiment of the present disclosure.

FIG. 5J is a front view of a single EPM chasses closure assembly in an open configuration in which a horizontally-oriented, single EPM is in a repelling state according to an embodiment of the present disclosure. The EPM control system in an embodiment may place a single EPM assembly 524 in a repelling polarity position in response to user input indicating the user would like to open the chasses 502 and 504 into a laptop or tablet configuration. Upon receipt of such a user instruction described above, the EPM control system in an embodiment may give the single EPM 524 within the base chassis 504 the second polarity having a north pole situated nearer the right side of the base chassis 504, which may be opposite the polarity of the permanent magnet 522 within the display chassis 502 situated adjacent the single EPM 524 within the base chassis 504.

Figure 5K:
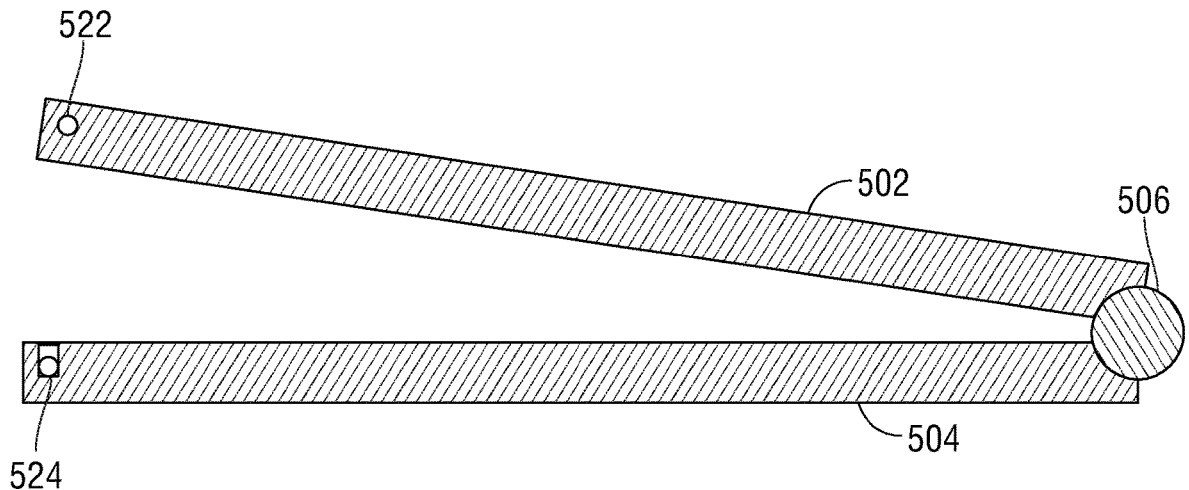
FIG. 5K is a cross-sectional side view of a single EPM chasses closure assembly in which a horizontally-oriented, single EPM is in a repelling state according to an embodiment of the present disclosure.

FIG. 5K is a cross-sectional side view of a single EPM chasses closure assembly in an open configuration in which a horizontally-oriented, single EPM is in a repelling state according to an embodiment of the present disclosure. The permanent magnet 522 and single EPM 524 in an embodiment in which their magnetic field polarities are opposite may repel one another. This repelling force, alone or in combination with the spring-loaded torque of the hinge 506, may cause the portion of the display chassis 502 located opposite the hinge 506 to rotate about the hinge 506, away from the portion of the base chassis 504 located opposite the hinge 506.

Figure 6A:
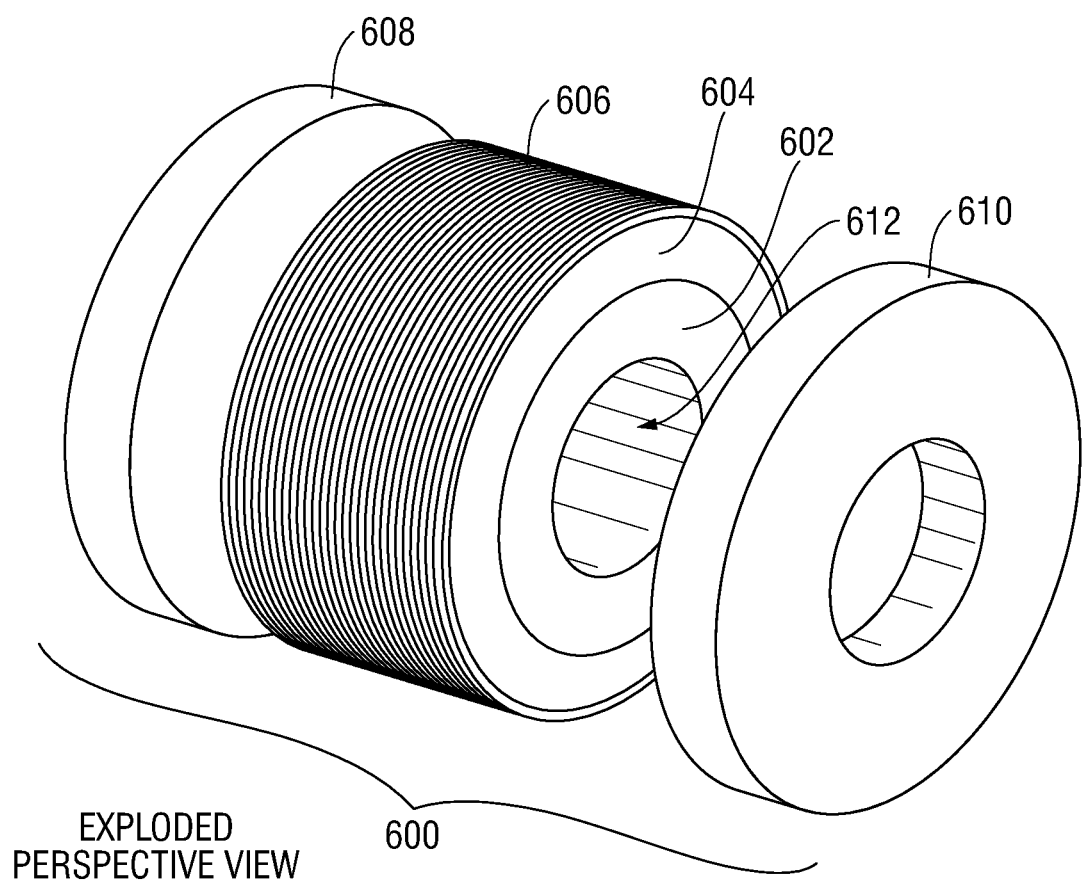
FIG. 6A is an exploded perspective view of an EPM pin detent assembly according to an embodiment of the present disclosure.

FIG. 6A is an exploded perspective view of an EPM pin detent assembly 600 to operably attach a peripheral device to an information handling system chassis according to an embodiment of the present disclosure. As described herein, many users employ a stylus to provide information via the touch-screen video display in a tablet configuration. Providing some ability to operably connect the stylus to one of the chasses of the information handling system may decrease the likelihood the relatively small stylus will be lost. A layered or other structure may be used with a stylus to tether the same via EPM pin detent assembly 600.

A ferromagnetic pin operably connected to a stylus or other small peripheral device (e.g. key fob, mechanism locking the chasses to a desk, thumb drive, or other dongle devices) may be inserted within an EPM pin detent assembly 600 in an embodiment. The EPM pin detent assembly 600 may include a cylindrical high-coercivity magnet 602. A pin opening 612 having an interior diameter greater than the pin to be inserted therein may be disposed throughout the length of the high-coercivity magnet 602 in an embodiment. The outer surface of the high-coercivity magnet 602 may be enclosed (partially or fully) within a low-coercivity magnet 604 having an interior diameter greater than the exterior diameter of the high-coercivity magnet 602. A coil 606 of electrically conductive wire may then partially or fully enclose the low-coercivity magnet 604. The high-coercivity magnet 602, low-coercivity magnet 604, and coil 606 in such an embodiment may form an EPM assembly.

A donut shunt plate 610 comprised of ferromagnetic material and having an interior diameter greater than the exterior diameter of the pin to be inserted may be operably connected or affixed to a first side of the EPM assembly. The donut shunt plate 610 may be affixed to the EPM assembly via soldering, adhesive, clamps, or other known methods. The donut shunt plate 610 may be affixed to the EPM assembly such that the inner surface of the donut shunt plate 610 lines up with the pin opening 612. In such an embodiment, the EPM pin detent assembly 600 may allow a pin having an exterior diameter smaller than the interior diameter of the donut shunt plate 610 and the diameter of the pin opening 612 to pass through the donut shunt plate 610 and into the pin opening 612. A solid shunt plate 608 comprised of ferromagnetic material may be affixed to a side of the EPM assembly opposite the donut shunt plate 610 using the same or similar methods to affix the donut shunt plate 610. The solid shunt plate 608 may inhibit movement of the pin beyond the high-coercivity magnet 602 upon insertion of the pin through the pin opening 612, toward the solid shunt plate 608.

Figure 6B:
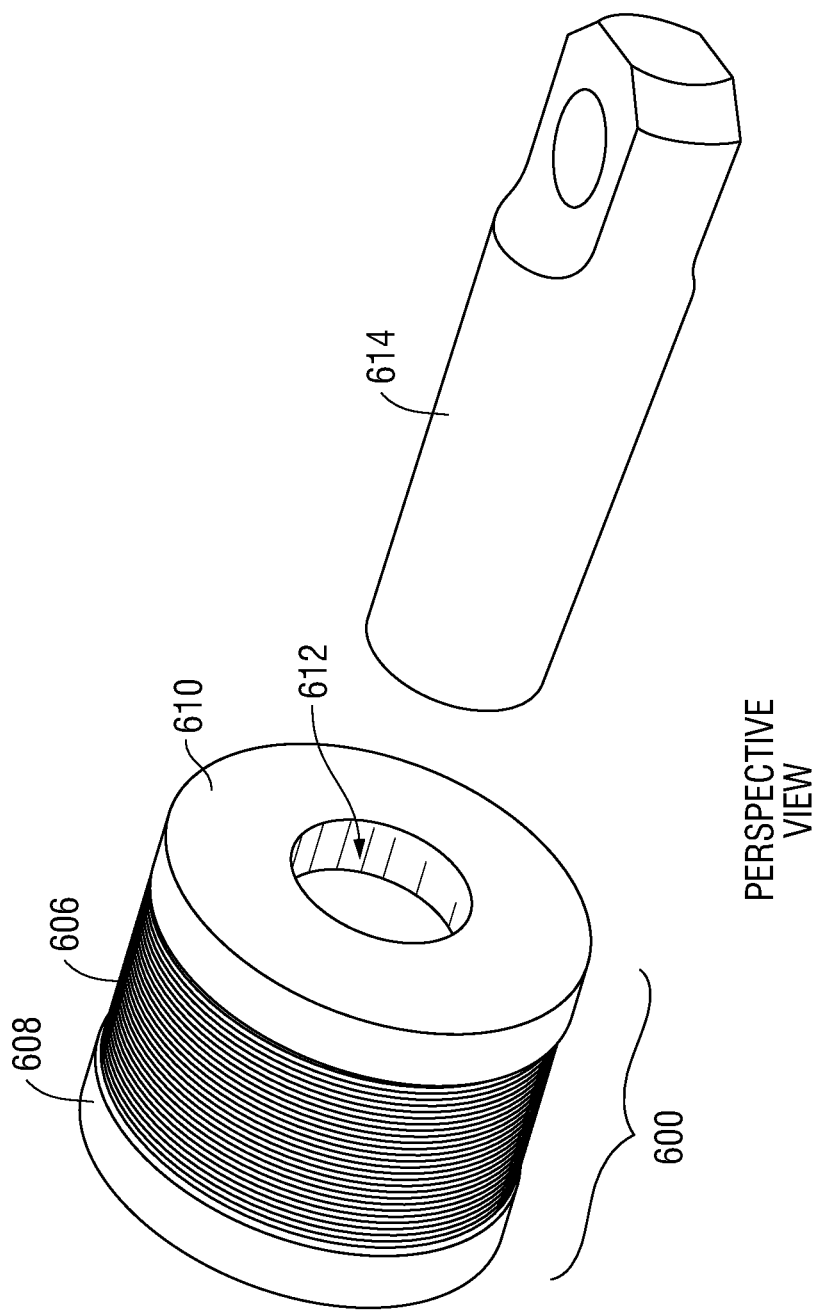
FIG. 6B is a perspective view of an EPM pin detent assembly and an associated pin according to an embodiment of the present disclosure.

FIG. 6B is a perspective view of an EPM pin detent assembly and an associated pin for insertion within the pin detent assembly according to an embodiment of the present disclosure. A pin such as lanyard pin 614 comprised of ferromagnetic material in an embodiment may be attached to a small peripheral device (e.g. key fob, mechanism locking the chasses to a desk, thumb drive, or other dongle devices). The lanyard pin 614 may then be inserted within the pin opening 612 in the donut shaped plate 610, and toward the solid shunt plate 608. Upon full insertion in such an embodiment, a portion of the lanyard pin 614 may be inserted within the EPM assembly around which the electrically conductive wire 606 is coiled. Following insertion of the lanyard pin 614, the EPM pin detent assembly 600 in an embodiment may be placed in an ON state in which the pin may not be removed, or in an OFF state in which the pin may be easily removed.

Figure 7A:
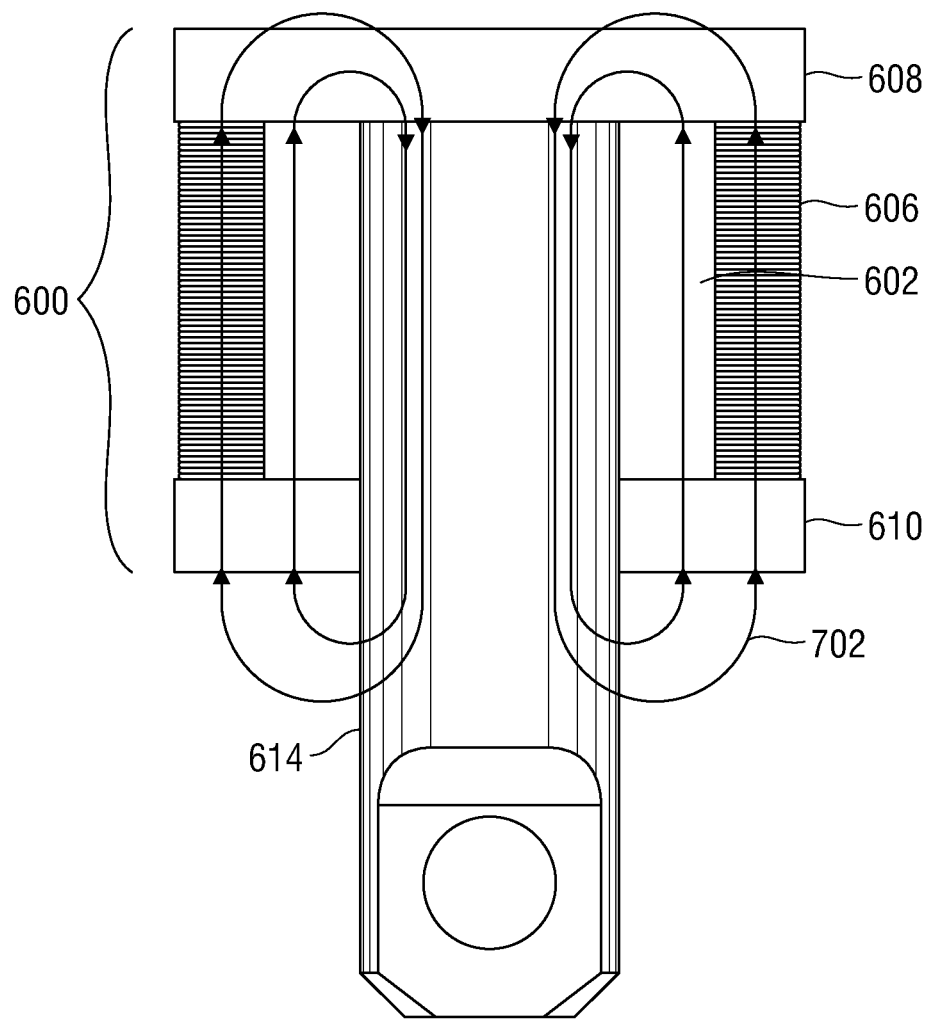
FIG. 7A is a cutaway front view of an EPM pin detent assembly with an EPM in an ON state according to an embodiment of the present disclosure.

FIG. 7A is a cutaway front view of an EPM pin detent assembly 600 with an EPM in an ON state to lock the position of an associated pin 614 within the detent assembly 600 according to an embodiment of the present disclosure. Upon insertion of a portion of the lanyard pin 614 within the high-coercivity magnet 602, the EPM control system in an embodiment may place the EPM pin detent assembly 600 in an ON state. For example, the EPM control system in an embodiment may apply a pulse of current through the coil 606 of electrically conductive wire such that the low-coercivity magnet (not shown, but enclosed within the coil 606) generates a magnetic field having the same polarity as the magnetic field generated by the high-coercivity magnet 602. This may cause the EPM assembly (including both the low-coercivity magnet and the high-coercivity magnet 602 to generate a combined magnetic field 702. Such a combined magnetic field in an embodiment may be propagated by the donut shunt plate 610 and the solid shunt plate 608, and may attract the ferromagnetic lanyard pin 614. This attractive force in an embodiment may lock the position of a portion of the lanyard pin 614 within the EPM pin detent assembly 600 when the EPM pin detent assembly 600 is placed in an ON state.

Figure 7B:
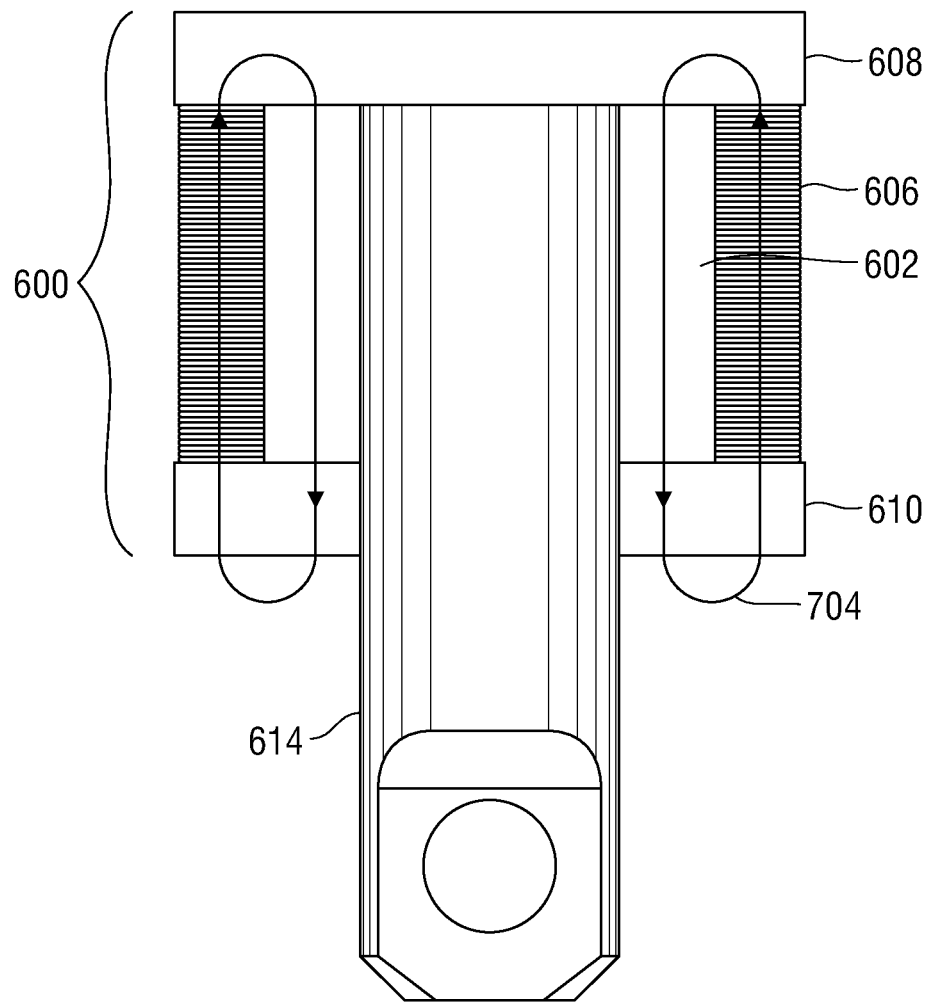
FIG. 7B is a cutaway front view of an EPM pin detent assembly with an EPM in an OFF state according to an embodiment of the present disclosure.

FIG. 7B is a cutaway front view of an EPM pin detent assembly with an EPM in an OFF state to allow removal of an associated pin from the detent assembly according to an embodiment of the present disclosure. The EPM control system in an embodiment may receive a user input indicating the user wishes to remove the lanyard pin 614 from the EPM pin detent assembly 600. For example, the EPM control system in an embodiment may receive an indication that a button has been depressed, a switch has been flipped, or a verbal user command has been detected. In other example embodiments, such received user input may take the form of input entered by the user via a keyboard or mouse, a voice command detected by a microphone of the information handling system, a thumbprint scanner, a signal transmitted via a microchip housed in a peripheral device (e.g., USB device, mobile information handling system, key fob) of the information handling system. Such mechanisms may require the user to provide some form of positive identification before transmitting user input to the EPM control system to allow the lanyard pin 614 to be removed from the EPM pin detent assembly 600. Other embodiments contemplate other types of security scanners/measures. For example, the information handling system may also comprise an iris scanner, or facial recognition methods.

Upon receipt of such a user instruction in an embodiment, the EPM control system may place the EPM pin detent assembly 600 in an OFF state. For example, the EPM control system may apply a pulse of current to the coil 606 in a direction opposite the direction in which the current was applied to place the EPM pin detent assembly 600 in an ON state. Application of such electrical current in the opposite direction may switch the polarity of the low-coercivity magnet (not shown, but enclosed within the coil 606) such that the poles of its magnetic field are opposite the poles of the magnetic field generated by the high-coercivity magnet 602 as shunted by shunt plate 608 and donut shunt plate 610. This results in an EPM magnetic field as shown in 704 in an OFF state. In such an embodiment, the magnetic field of the low-coercivity magnet may then cancel out the magnetic field of the high-coercivity magnet 602, such that the EPM pin detent assembly 600 no longer attracts the ferromagnetic lanyard pin 614. Thus, the lanyard pin 614 may be easily removed from the interior of the EPM pin detent assembly 600 when the EPM pin detent assembly 600 is placed in such an OFF state.

Figure 8A:
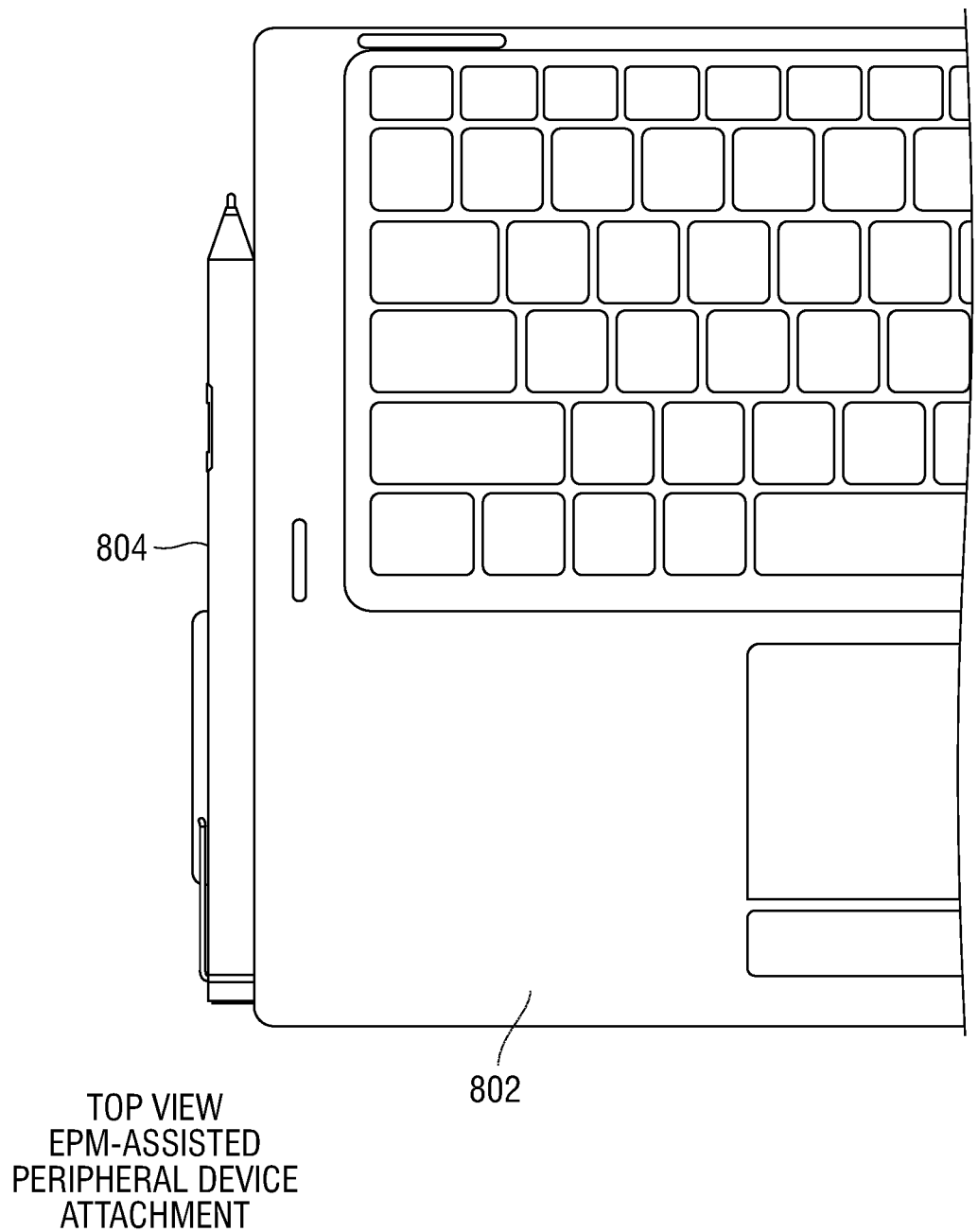
FIG. 8A is top view of an EPM-assisted peripheral device attachment system according to an embodiment of the present disclosure.

FIG. 8A is top view of an EPM-assisted peripheral device attachment system to operably attach a peripheral device to a base chassis according to an embodiment of the present disclosure. As described herein, many users employ a stylus to provide information via the touch-screen video display in a tablet configuration. Providing some ability to operably connect the stylus to one of the chasses of the information handling system may decrease the likelihood the relatively small stylus will be lost. Embodiments of the present disclosure employ EPM assemblies to operably connect peripheral devices (e.g. key fob, mechanism locking the chasses to a desk, thumb drive, or other dongle devices) to a chassis of the information handling system. For example, an EPM assembly in an embodiment may operably connect a peripheral device (e.g. stylus) with a ferromagnetic housing 804 to an exterior surface of a base chassis 802 of an information handling system.

Figure 8B:
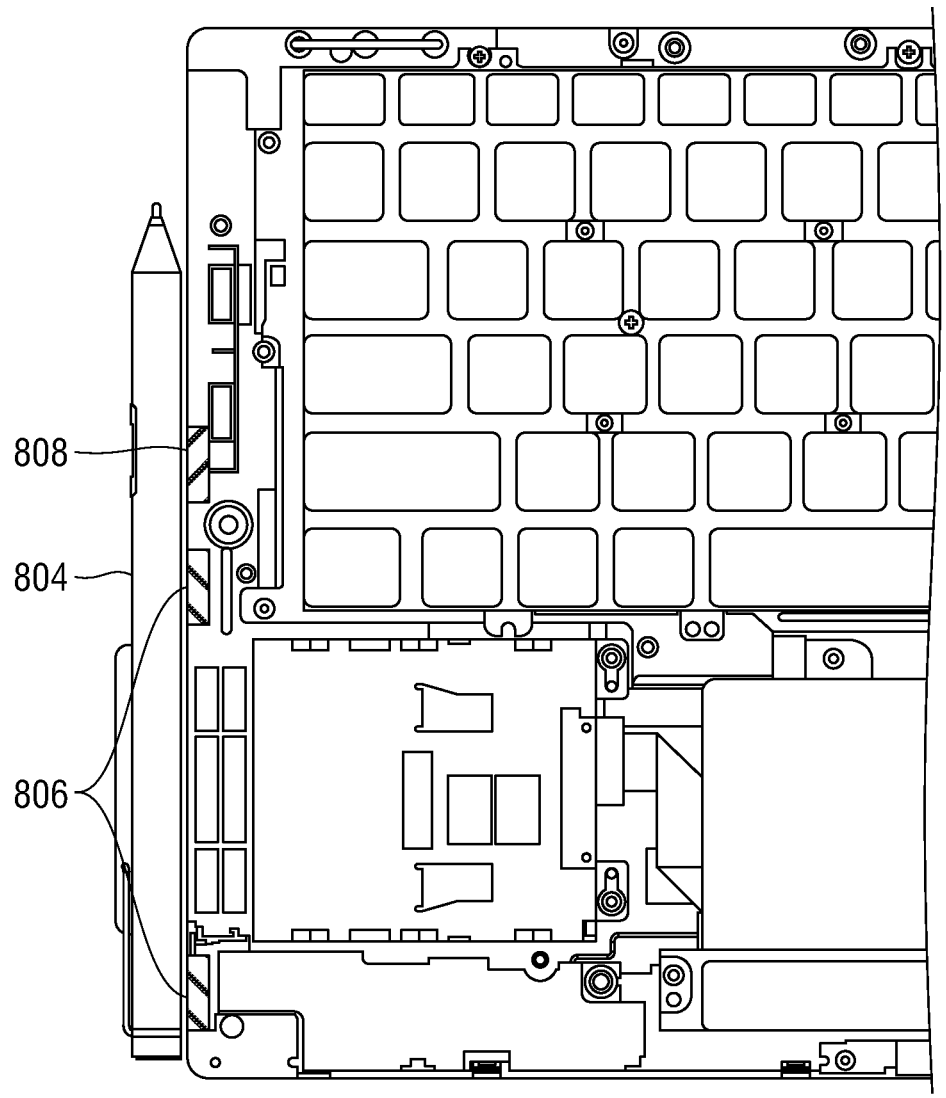
FIG. 8B is a cutaway top view of an EPM-assisted peripheral device attachment system according to an embodiment of the present disclosure.

FIG. 8B is a cutaway top view of an EPM-assisted peripheral device attachment system to operably attach a peripheral device to a base chassis according to an embodiment of the present disclosure. In an embodiment, a peripheral device 804 with a ferromagnetic housing may be operably connected to the base chassis by a magnetic field generated by an EPM assembly 808 placed in an ON state and housed within the base chassis. In some embodiments, the operable connection between the base chassis and the peripheral device 804 may be bolstered by addition of one or more permanent magnets 806 also housed within the base chassis attracting the ferromagnetic peripheral device housing 804. The magnetic field generated by the permanent magnets 806 in such an embodiment may have a magnitude sufficiently small enough to allow a user to pull the peripheral device 804 away from the base chassis with intentional effort.

In another embodiment, the EPM assembly 808 may be a dual-contact EPM housing assembly described herein. In such an embodiment, the peripheral device housing 804 may further include an EPM aligned with one of the magnetic contacts of the dual-contact EPM housing assembly 808. The magnetic field polarity of the EPM within the peripheral device housing 804 in such an embodiment may be opposite the polarity of the magnetic field propagated by the dual-contact EPM housing assembly 808. The EPM control system in such an embodiment may place the dual-contact EPM housing assembly 808 in an attractive state by causing the magnetic contact not aligned with the EPM within the peripheral device housing 804 to attract the ferromagnetic peripheral device housing 804 material. In another aspect, the EPM control system may place the dual-contact EPM housing assembly 808 in a repelling state by causing the magnetic contact aligned with the EPM within the peripheral device housing 804 to propagate a magnetic field opposite the magnetic field of the EPM within the peripheral device housing 804, and thus, to repel the EPM within the peripheral device housing 804.

Figure 9:
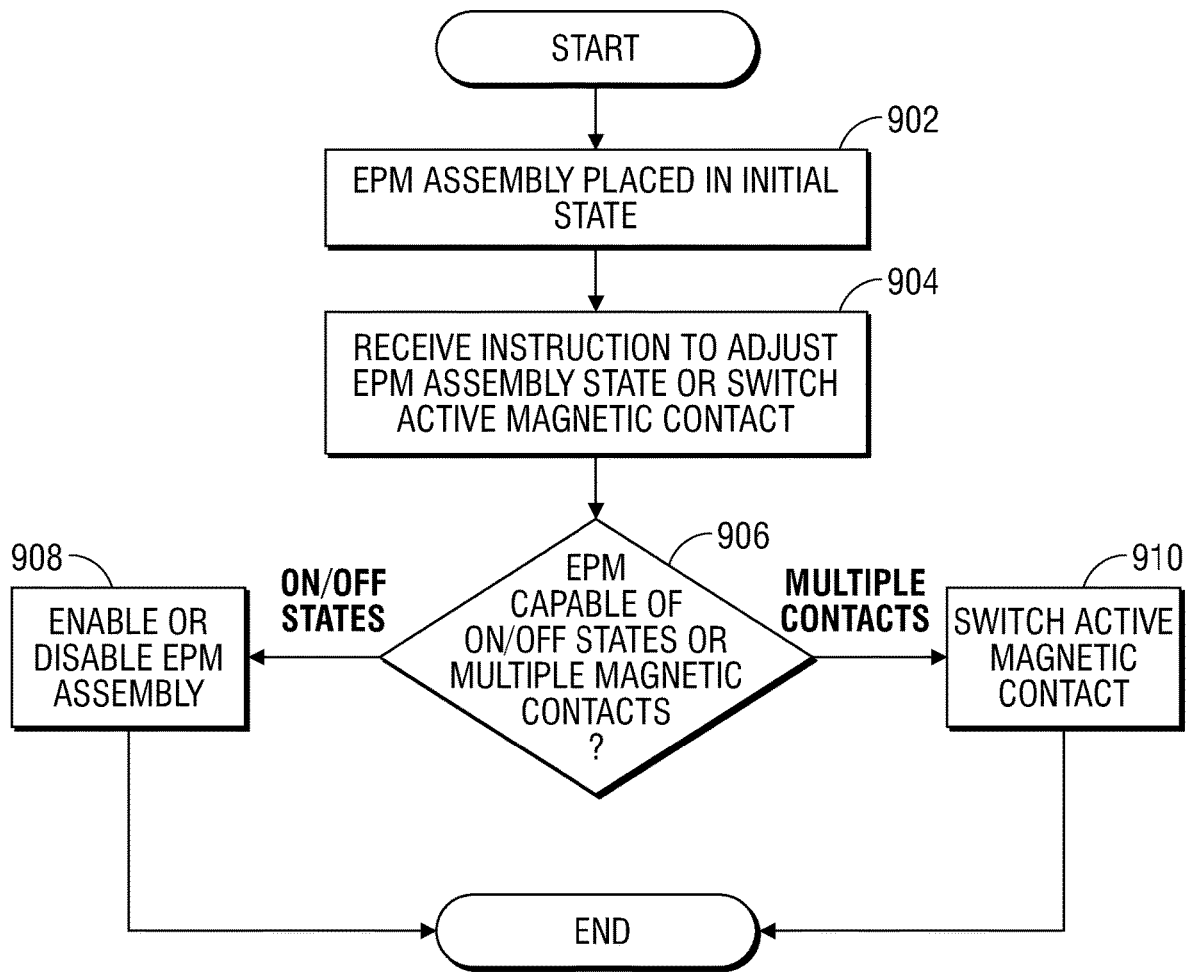
FIG. 9 is a flow diagram illustrating a method of controlling a state, or which magnetic contact is active within an EPM assembly according to an embodiment of the present disclosure.

FIG. 9 is a flow diagram illustrating a method of controlling a state, or which magnetic contact is active within an EPM assembly based on received instructions according to an embodiment of the present disclosure. Multiple embodiments of the present disclosure employ EPM assemblies controllable by an EPM control system. FIG. 9 describes the method by which such an EPM control system may alter the state of one or more of these EPM assemblies.

At block 902, an EPM assembly may be placed in an initial state. For example, in an embodiment described with reference to FIG. 2A, a dual-contact EPM assembly may be placed in a first state in which the magnetic contact 208 propagates the magnetic fields 214 and 216, while the magnetic contact 206 is magnetically neutral perpendicularly with respect to the dual-contact EPM assembly 200. As another example, in an embodiment described with reference to FIG. 5A, the attractive EPM 512 may be placed in an ON state, in which it attracts the ferromagnetic contact 510, causing the portion of the display chassis 502 located opposite the hinge 506 to operably connect to the portion of the base chassis 504 located opposite the hinge 506. As still another example, in an embodiment described with reference to FIG. 5C, the dual-EPM first magnetic contact 514 may propagate a magnetic field that attracts the ferromagnetic contact 510, causing the portion of the display chassis 502 located opposite the hinge 506 to operably connect to the portion of the base chassis 504 located opposite the hinge 506. As yet another example, in an embodiment described with reference to FIG. 7A, a low-coercivity magnet enclosed within the coil 606 may generate a magnetic field having the same polarity as the magnetic field generated by the high-coercivity magnet 602, such that the low-coercivity magnet and high-coercivity magnet 602 in combination generate the combined magnetic field 702 to attract the ferromagnetic lanyard pin 614.

The EPM control system in an embodiment may receive an instruction to adjust the EPM assembly state or switch the active magnetic contact with the EPM assembly at block 904. For example, in an embodiment described with reference to FIG. 4A, the EPM control system in an embodiment may receive user input indicating the user would like to detach the display chassis 402 from the base chassis 404. Such received user input in an embodiment may take the form of input entered by the user via a keyboard, mouse, or button/switch type mechanism housed within the base chassis 404 or the display chassis 402. In another aspect, such user input may take the form of a voice command detected by a microphone of the information handling system, an orientation of the display chassis 402 with respect to the base chassis 404 (e.g., placement in a tablet configuration) detected by a gyroscope or hall effect sensor of the information handling system.

As another example, in embodiments described with reference to FIGS. 5B and 5D, the EPM control system may receive user input indicating the user would like to open the chasses into a laptop or tablet configuration. At yet another example, in an embodiment described with reference to FIG. 7B, the EPM control system in an embodiment may receive a user input indicating the user wishes to remove the lanyard pin 614 from the EPM pin detent assembly 600. Such received user input in these various embodiments may take the form of input entered by the user via a keyboard, mouse, or button/switch type mechanism housed within the base chassis 504 or the display chassis 502. In another aspect, such user input may take the form of a voice command detected by a microphone of the information handling system, a thumbprint scanner, a signal transmitted via a microchip housed in a peripheral device (e.g., USB device, mobile information handling system, key fob) of the information handling system. Such mechanisms may require the user to provide some form of positive identification before transmitting user input to the EPM control system to open the chasses in an embodiment. Other embodiments contemplate other types of security scanners/measures. For example, the information handling system may also comprise an iris scanner, or facial recognition methods.

At block 906, it may be determined whether the EPM is capable of switching between ON/OFF states or switching between activation of a plurality of magnetic contacts in an embodiment or multiple types of EPM systems are deployed according to embodiments herein. For example, in an embodiment described with reference to FIGS. 2A and 2B, the dual-contact EPM assembly may be capable of operating in a first state in which the magnetic contact 208 propagates one or more magnetic fields (e.g., 214 and 216) to act on ferromagnetic materials situated perpendicular with respect to a top surface of the dual-contact EPM assembly 200 while the magnetic contact 206 remains magnetically neutral in that direction, and a second state in which the magnetic contact 206 propagates one or more magnetic fields (e.g. 218 and 220) to act on ferromagnetic materials situated perpendicular with respect to a top surface of the dual-contact EPM assembly 200 while the magnetic contact 208 remains magnetically neutral in that direction. As another example, in an embodiment described with reference to FIGS. 7A and 7B, the EPM pin detent assembly 600 may be capable of operating in an ON state, in which the poles of the magnetic field generated by the low-coercivity magnet align with the poles of the magnetic field generated by the high-coercivity magnet 602. These respective magnetic fields may then combine in such an embodiment to form a combined magnetic field 702 when the EPM is placed in an ON state. The EPM pin detent assembly 600 may also be capable of operating in an OFF state, in which the polarity of the low-coercivity magnetic field is opposite the polarity of the magnetic field generated by the high-coercivity magnet 602. These respective magnetic fields may then negate one another, such that the EPM pin detent assembly 600 does not attract the ferromagnetic lanyard pin 614 when the EPM is placed in an OFF state. If the EPM assembly is capable of an ON state and an OFF state in an embodiment, the method may proceed to block 908. If the EPM assembly is capable of switching activation between multiple magnetic contacts in an embodiment, the method may proceed to block 910. It is understood that some embodiments of an EPM control system may be used with only one EPM system or one type of EPM system such that a determination of the type of EPM system at 906 may not be necessary in some embodiments.

The EPM control assembly in an embodiment in which the EPM assembly is capable of switching between ON/OFF states may enable or disable the EPM assembly at block 908, based on received instructions. For example, in an embodiment described with reference to FIG. 4B, in which the left base chassis EPM assembly 414 at block 902 propagates a magnetic field that attracts the left display chassis EPM assembly 416, and the right base chassis EPM assembly 418 propagates a magnetic field that attracts the right display chassis EPM assembly 420, the EPM control system may place each of the EPM assemblies 414-420 in an OFF state at block 908, such that none of the EPM assemblies 414-420 attract one another. As another example of that embodiment, the EPM control system may place the base chassis EPM assemblies 414 and 418 in an OFF state at block 908, such that they do not attract the display chassis EPM assemblies 416 and 420. As yet another example of that embodiment, the EPM control system may place the display chassis EPM assemblies 416 and 420 in an OFF state at block 908, such that they do not attract the base chassis EPM assemblies 414 and 418. In another embodiment in which the left display chassis EPM assembly 416 and right display chassis EPM assembly 420 are replaced by ferromagnetic material that is attracted toward the base chassis magnets 414 and 418 at block 902, the EPM control system may place the base chassis magnets 414 and 418 in an OFF state at block 908, such that they do not attract the ferromagnetic material located in place of the EPM assemblies 416 and 420. In another embodiment in which the left base chassis EPM assembly 414 and right base chassis EPM assembly 418 are replaced by ferromagnetic material that is attracted toward the display chassis magnets 416 and 420 at block 902, the EPM control system may place the display chassis magnets 416 and 420 in an OFF state at block 908, such that they do not attract the ferromagnetic material located in place of the EPM assemblies 414 and 418.

In each of these embodiments, upon receipt of user input indicating user desire to detach the display chassis 402 from the base chassis 404, the EPM assemblies 416 and 420 (or ferromagnetic material) within the display chassis 402 may cease to attract or to be attracted toward the EPM assemblies 414 and 418 (or ferromagnetic material) within the base chassis 404. In such an embodiment, upon placement of the one or more EPM assemblies 414-420 in such an OFF state, the combined magnitude of forces operably attaching the display chassis 402 to the base chassis 404 may decrease markedly. This may allow the user to overcome the attractive forces between the permanent magnets 406 and 408 and between the permanent magnets 410 and 412, respectively, so as to detach the base chassis 404 from the display chassis 402.

As another example, in an embodiment described with reference to FIG. 5B, the EPM control system may place the attractive EPM 512 in an OFF state at block 908, such that it no longer attracts the ferromagnetic contact 510. In such a scenario, the permanent repelling magnet 508 may continue to repel the ferromagnetic contact 510. In the absence of a magnetic field generated by the EPM 512, the permanent repelling magnet 508 may repel the ferromagnetic contact 510, causing the portion of the display chassis 502 located opposite the hinge 506 to rotate about the hinge 506, away from the portion of the base chassis 504 located opposite the hinge 506.

As yet another example, in an embodiment described with reference to FIG. 7B, the EPM control system may place the EPM pin detent assembly 600 in an OFF state at block 908 by applying a pulse of current to the coil 606 in a direction opposite the direction in which the current was applied to place the EPM pin detent assembly 600 in an ON state. Application of such electrical current in the opposite direction may switch the polarity of the low-coercivity magnet (not shown, but enclosed within the coil 606) such that the poles of its magnetic field are opposite the poles of the magnetic field generated by the high-coercivity magnet 602. In such an embodiment, the magnetic field of the low-coercivity magnet may then cancel out the magnetic field of the high-coercivity magnet 602, such that the EPM pin detent assembly 600 no longer attracts the ferromagnetic lanyard pin 614. In other embodiments in which the EPM assembly is placed in an initial OFF state at block 902, the EPM assembly may be placed in an ON state at block 908. The EPM control system may also operate an enable or disable function with other embodiment variations in accord with various systems described herein. The method may then end.

At block 910, the EPM control assembly in an embodiment in which the EPM assembly is capable of activating one of multiple magnetic contacts may switch the active magnetic contact, based on received instructions. As an example, in an embodiment described with reference to FIG. 2B, the EPM control system may apply a current pulse to the wire 204 to reverse the polarity of the low-coercivity magnet 202, causing the magnetic contact 206 to propagate one or more magnetic fields (e.g. 218 and 220) perpendicular to the top surface of the dual-contact EPM assembly 200, while magnetic contact 208 remains magnetically neutral in that direction. Thus, the EPM control system in such an embodiment may switch the magnetically active (e.g. propagating a magnetic field to attract ferromagnetic material situated perpendicularly with respect to the top surface of the dual-contact EPM assembly 200) from magnetic contact 208 to magnetic contact 206.

As another example, in an embodiment described with reference to FIG. 4B, in which one or more of the EPM assemblies 414-420 comprises a dual-contact EPM housing assembly, the EPM control system may switch the EPM assemblies 414-420 from a first, magnetically attractive state, to a second, magnetically neutral state. For example, the left base chassis EPM assembly 414 in such an embodiment may comprise a dual-contact EPM housing, and the left display chassis EPM assembly 416 may be replaced by a ferromagnetic material located directly above only one of the two magnetic contacts of the dual-contact EPM housing 414 when the display chassis 402 is operably connected or attached to the base chassis 404. The magnetic contact located directly below the ferromagnetic material may attract the ferromagnetic material when the left base chassis EPM assembly 414 in such an embodiment is placed in a first magnetically attractive state at block 902. The EPM control system in such an embodiment may switch the polarity of a low-coercivity magnetic within the dual-contact assembly 414 at block 910, placing the dual-contact assembly 414, in a second, magnetically neutral state with respect to the ferromagnetic material situated adjacent the dual-contact EPM housing 414 upon receipt of a user input indicating user desire to detach the display chassis 402 from the base chassis 404. When placed in such a second, magnetically neutral state in such an embodiment, the magnetic contact located directly beneath the ferromagnetic material may become magnetically neutral and cease to attract the ferromagnetic material. Upon receipt of user input indicating user desire to detach the display chassis 402 from the base chassis 404, the EPM assemblies 416 and 420 (or ferromagnetic material) within the display chassis 402 may cease to attract or to be attracted toward the EPM assemblies 414 and 418 (or ferromagnetic material) within the base chassis 404. In such an embodiment, upon placement of the one or more EPM assemblies 414-420 in such an OFF state, the combined magnitude of forces operably attaching the display chassis 402 to the base chassis 404 may decrease markedly.

As another example, in an embodiment described with reference to FIG. 5D, the EPM 512 may have a polarity opposite the magnetic field propagated by the second magnetic contact 516, such that the second magnetic contact 516 magnetic field repels the EPM 512. The EPM control system in such an embodiment may place the dual-EPM assembly in a second state at block 910 in which the first magnetic contact 514 is magnetically neutral with respect to ferromagnetic contact 510, and the second magnetic contact 516 propagates a magnetic field to repel the EPM 512. This repelling force, alone or in combination with the spring-loaded torque of the hinge 506, may cause the portion of the display chassis 502 located opposite the hinge 506 to rotate about the hinge 506, away from the portion of the base chassis 504 located opposite the hinge 506. The EPM control system may also operate an enable or disable function with other embodiment variations in accord with various systems described herein. The method may then end.

The blocks of the flow diagram of FIG. 9 or steps and aspects of the operation of the embodiments herein and discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A dual-contact electro-permanent magnet (EPM) assembly of an information handling system comprising:
   a plurality of high-coercivity magnets situated with respect to one another on opposite ends of a low-coercivity magnet, wherein the polarity of the low-coercivity magnet correlates directly to a direction of current pulse applied to an electrically conductive wire coiled around at least a portion of the low-coercivity magnet;
   a first EPM magnetic contact disposed between a first of the plurality of high-coercivity magnets and the low-coercivity magnet;
   a second EPM magnetic contact disposed between a second of the plurality of high-coercivity magnets and the low-coercivity magnet; and
   wherein, dependent upon the polarity of the low-coercivity magnet, the first EPM magnetic contacts is capable of operating in an attractive magnetic state to propagate a magnetic field attracting a ferromagnetic contact of a peripheral device while second EPM magnetic contact is magnetically neutral with respect to the ferromagnetic contact.

2. The EPM assembly of claim 1, wherein the dual-contact EPM assembly is housed in a portion of a base chassis also housing a keyboard of a convertible information handling system, and the ferromagnetic contact is housed within a display chassis of the convertible information handling system to operably connect and hinge the display chassis to the base chassis when the first EPM magnetic contact is operating in the attractive magnetic state.

3. The EPM assembly of claim 2, wherein dependent upon the polarity of the low-coercivity magnet, the second EPM magnetic contact is capable of propagating a magnetic field that does not attract the ferromagnetic contact of the peripheral device while the first EPM magnetic contact is magnetically neutral with respect to the ferromagnetic contact.

4. The EPM assembly of claim 2, wherein dependent upon the polarity of the low-coercivity magnet, the second EPM magnetic contact is capable of propagating a magnetic field to repel an EPM housed within the peripheral device while the first EPM magnetic contact is magnetically neutral with respect to the ferromagnetic contact.

5. The EPM assembly of claim 1, wherein the dual-contact EPM assembly is housed in a portion of a base chassis of the information handling system located opposite a display chassis of the information handling system in a closed position, and the ferromagnetic contact of the peripheral device is housed within a portion of the display chassis, such that the display chassis may not be opened about a hinge when the first EPM magnetic contact is operating in the attractive magnetic state to attract the ferromagnetic contact.

6. The EPM assembly of claim 5, wherein dependent upon the polarity of the low-coercivity magnet, the second EPM magnetic contact is capable of propagating a magnetic field that does not attract the ferromagnetic contact of the peripheral device while the first EPM magnetic contact is magnetically neutral with respect to the ferromagnetic contact.

7. The EPM assembly of claim 5, wherein dependent upon the polarity of the low-coercivity magnet, the second EPM magnetic contact is capable of propagating a magnetic field to repel an EPM housed within the peripheral device while the first EPM magnetic contact is magnetically neutral with respect to the ferromagnetic contact.

8. A method of controlling a state of a dual-contact electro-permanent magnet (EPM) assembly of an information handling system comprising:
   delivering a first pulse of current in a first direction to an electrically conductive wire coiled around at least a portion of a low-coercivity magnet situated between a plurality high-coercivity magnets of the dual-contact EPM assembly housed within a chassis of the information handling system to propagate a low-coercivity magnetic field having poles that align with poles of a first of the plurality of high-coercivity magnets of the dual-contact EPM assembly;
   propagating an attractive magnetic field via a first magnetic contact situated between the low-coercivity magnet and the first of the plurality of high-coercivity magnets to attract a ferromagnetic contact housed within a peripheral device and to operably connect the peripheral device to the chassis;
   receiving a user instruction to disconnect the peripheral device from the chassis;
   delivering a second pulse of current in a second direction, opposite the first direction, to the electrically conductive wire to propagate a low-coercivity magnetic field having poles that align with poles of a second of the plurality of high-coercivity magnets; and
   propagating an non-attractive magnetic field via a second magnetic contact situated between the low-coercivity magnet and the second of the plurality of high-coercivity magnets that does not attract the ferromagnetic contact housed within the peripheral device.

9. The method of claim 8, wherein the dual-contact EPM assembly is housed in a portion of a base chassis also housing a keyboard of a convertible information handling system, and the ferromagnetic contact is housed within a display chassis of the convertible information handling system to operably connect and hinge the display chassis to the base chassis when the first EPM magnetic contact is operating in the attractive magnetic state.

10. The method of claim 9 further comprising:
    repelling, via the second magnetic contact an EPM housed within the peripheral device.

11. The method of claim 8, wherein the dual-contact EPM assembly is housed in a portion of a base chassis of the information handling system located opposite a display chassis of the information handling system in a closed position, and the ferromagnetic contact of the peripheral device is housed within a portion of the display chassis, such that the display chassis may not be opened about a hinge when the first EPM magnetic contact is operating in the attractive magnetic state to attract the ferromagnetic contact.

12. The method of claim 11 further comprising:
    repelling, via the second magnetic contact an EPM housed within the peripheral device.

13. The method of claim 8, wherein the dual-contact EPM assembly is housed in a portion of a base chassis of the information handling system, and the ferromagnetic contact of the peripheral device comprises a housing of a stylus, such that the stylus may not be detached from the base chassis when the first EPM magnetic contact is operating in the attractive magnetic state to attract the ferromagnetic contact.

14. The method of claim 13 further comprising:
    repelling, via the second magnetic contact an EPM housed within the peripheral device.

15. A peripheral device attachment assembly of an information handling system comprising:
- an electro-permanent magnet (EPM) assembly including a cylindrical high-coercivity magnet disposed within a cylindrical low-coercivity magnet;
- an electrically conductive wire coiled around an outer curved surface of the low-coercivity magnet;
- the high-coercivity magnet and low-coercivity magnet disposed between a plurality of shunt plates having flat surfaces situated perpendicular to a shared cylindrical axis of the low-coercivity magnet and the high-coercivity magnet;
- an opening disposed throughout the thickness of a first of the plurality of shunt plates, and the high-coercivity magnet to allow for insertion of a ferromagnetic pin;
- wherein the EPM assembly is capable of operating in a plurality of magnetic states based on a direction of current pulse applied to the electrically conductive wire, including an attractive magnetic state applying an EPM magnetic force to attract the EPM assembly to the ferromagnetic pin.

16. The peripheral device attachment assembly of claim 15, wherein the EPM assembly is housed in a portion of a base chassis also housing a keyboard of the information handling system.

17. The peripheral device attachment assembly of claim 15, wherein the plurality of magnetic states includes a non-attractive magnetic state in which poles of a magnetic field generated by the low-coercivity magnet are opposite poles of a magnetic field generated by the high-coercivity magnet.

18. The peripheral device attachment assembly of claim 17, wherein an EMP control system of the information handling system places the EPM assembly into the non-attractive magnetic state in response to a user instruction to release the ferromagnetic pin.

19. The peripheral device attachment assembly of claim 15, wherein the high-coercivity magnet is comprised of Neodymium Iron Boron.

20. The peripheral device attachment assembly of claim 15, wherein the low-coercivity magnet is comprised of aluminum, nickel and cobalt.

* * * * *